(12) United States Patent
Wilson et al.

(10) Patent No.: US 8,668,949 B2
(45) Date of Patent: Mar. 11, 2014

(54) DUTCH OVEN COOK STATION APPARATUS AND METHOD

(75) Inventors: Todd G. Wilson, Spanish Fork, UT (US); Andreas Robert Haase, Park City, UT (US)

(73) Assignee: Todd Wilson, Spanish Fork, UT (US)

( * ) Notice: Subject to any disclaimer, the term of this patent is extended or adjusted under 35 U.S.C. 154(b) by 139 days.

(21) Appl. No.: 13/215,502

(22) Filed: Aug. 23, 2011

(65) Prior Publication Data

US 2012/0070556 A1 Mar. 22, 2012

Related U.S. Application Data

(60) Provisional application No. 61/383,667, filed on Sep. 16, 2010.

(51) Int. Cl.
*A47J 37/07* (2006.01)

(52) U.S. Cl.
USPC .............. 426/523; 99/340; 99/449; 99/450; 126/9 B

(58) Field of Classification Search
USPC ............... 426/523; 99/339, 340, 450, 449; 126/9 R, 9 B
See application file for complete search history.

(56) References Cited

U.S. PATENT DOCUMENTS

| | | | | |
|---|---|---|---|---|
| 2,915,001 A | * | 12/1959 | Montgomery | 99/339 |
| 3,191,592 A | * | 6/1965 | Lorbacher | 126/25 A |
| 3,398,733 A | * | 8/1968 | Bradley | 126/25 A |
| 3,459,171 A | * | 8/1969 | Swanson | 126/25 R |
| 4,166,413 A | * | 9/1979 | Meszaros | 99/393 |
| 4,539,901 A | * | 9/1985 | Chen | 99/393 |
| 4,621,608 A | * | 11/1986 | Lee | 126/9 R |
| 4,741,321 A | * | 5/1988 | Squires | 126/9 R |
| 4,903,683 A | | 2/1990 | Larsen et al. | |
| 4,909,235 A | | 3/1990 | Boetcker | |
| 4,925,137 A | * | 5/1990 | Hastings | 248/148 |
| 5,165,385 A | * | 11/1992 | Doolittle et al. | 126/25 R |
| 5,183,304 A | | 2/1993 | Mair | |
| 5,333,540 A | * | 8/1994 | Mazzocchi | 99/421 H |
| 5,611,264 A | | 3/1997 | Studer | |
| 5,850,829 A | * | 12/1998 | Taylor et al. | 126/30 |
| 6,182,650 B1 | | 2/2001 | Tuttle | |
| 6,314,955 B1 | * | 11/2001 | Boetcker | 126/9 R |
| 6,357,344 B2 | * | 3/2002 | O'Grady et al. | 99/340 |
| 6,439,111 B1 | * | 8/2002 | Lu | 99/449 |
| 6,439,225 B2 | * | 8/2002 | Bach et al. | 126/519 |
| 6,474,327 B1 | * | 11/2002 | Bossler | 126/41 R |
| 6,539,843 B2 | * | 4/2003 | Andress | 99/385 |
| 6,595,198 B2 | * | 7/2003 | Mosher et al. | 126/38 |
| 6,684,877 B2 | * | 2/2004 | Wu | 126/41 R |
| 6,945,243 B1 | * | 9/2005 | Walker et al. | 126/9 R |
| 7,004,063 B1 | * | 2/2006 | Li | 99/339 |
| D525,077 S | | 7/2006 | White et al. | |

(Continued)

*Primary Examiner* — Drew E Becker
(74) *Attorney, Agent, or Firm* — Pate Baird, PLLC

(57) ABSTRACT

A fire pan provides a table-top or ground-supported pan or tray to hold a source of heat such as charcoal, burning wood, gas burner, and so forth. The pan places the heat source away from a surface, thus not damaging lawns, tabletops, parking lots, sidewalks, or other supporting surfaces. The pan may support one or more Dutch ovens, thus providing a "fire pit" of modest size, foldable into a very small envelope. Handles are extendible away from the pan for handling or moving, even when hot coals are present. The legs below are curved to fold up along the contour of the bottom surface of the pan.

20 Claims, 18 Drawing Sheets

(56) References Cited

U.S. PATENT DOCUMENTS

| 7,415,979 | B1 * | 8/2008 | Macri et al. | 126/9 R |
| 7,984,709 | B1 * | 7/2011 | Byrnes et al. | 126/250 |
| 2002/0144605 | A1 * | 10/2002 | Fawson | 99/340 |
| 2007/0199555 | A1 * | 8/2007 | Gregory | 126/9 R |
| 2009/0095277 | A1 * | 4/2009 | Johnson et al. | 126/25 R |
| 2010/0242942 | A1 * | 9/2010 | Chang | 126/19 R |
| 2010/0285906 | A1 * | 11/2010 | Wares | 473/433 |

* cited by examiner

DUTCH OVEN COOK STATION APPARATUS AND METHOD

RELATED APPLICATIONS

This application claims the benefit of U.S. Provisional Patent Application Ser. No. 61/383,667, filed on Sep. 16, 2010 for DUTCH OVEN COOKING KIT APPARATUS AND METHOD.

BACKGROUND

1. The Field of the Invention

This invention relates to camping equipment and, more particularly, to novel systems and methods for camp cooking, particularly using a camp oven or Dutch oven.

2. The Background Art

Camp cooking has experienced many forms, adopted many technologies, and often proceeded in the absence of technology. Grilling, typically by means of charcoal, gas grills, smokers, open fires, and the like has taken an iconic place in American cuisine. Pots and means to heat them are another area with a multitude of systems available.

Tabletop grills, massive built-in grill systems, and about every size and shape of system in between has been marketed. Likewise, every source of heat imaginable from solar energy to firewood, has been tried or used in some way for cooking. Thus, whether one is seeking a feature-rich, built-in, permanent cook station in a home or on a patio, or is rather seeking to slightly ameliorate the sharp edges of roughing it in the woods, cooking equipment has a place in family camping.

The Dutch oven is a cooking pot or container fashioned as a three-legged, flat-bottomed kettle, having a fitted lid with a rim extending upward from the outer edge thereof to hold burning wood, charcoal, or the like thereon. The Dutch oven was a staple of the American colonial period, and the settling of the American west. World championships are still held today to test and showcase the cooking skills of individuals who enjoy cooking with a Dutch oven.

Dutch ovens require fire below as well. Some surface is required to support the oven and the fire or "coals." That surface may be the ground. Sometimes a steel table holds the fire. In this regard, adaptability may be a very desirable feature of any equipment system. Whether exercise equipment, automobiles, boats, tools, or any other device, adaptability to different conditions, circumstances, and the like may be a very valuable feature.

It would be an advance in the art to provide an ability to keep a fire (e.g., whether burning wood, charcoal, or some type of burning gas) spaced above and away from a supporting surface, such as a table, lawn, pavement, or the like. A small, compact, foldable stabilizer could be helpful. Likewise, it would be an advance in the art to provide handles on such a cooking station that might permit movement thereof, even when hot.

Likewise, it would be an advance in the art to provide space for setting utensils, lids from kettles or Dutch ovens, or the like nearby, and not on the ground where they will pick up dirt, grass, and so forth, and may drop it back into the pot or oven. Similarly, it would be an advance in the art if such a system were made to be comparatively lightweight, and easily portable. It would be a further advance in the art if such a system could be folded up into a minimal envelope or spatial volume requirement for transport, storage, and so forth.

BRIEF SUMMARY OF THE INVENTION

Accordingly, Applicant has developed an adaptable system for cooking with a Dutch oven or pot, or simply grilling in a camping or patio environment. In view of the foregoing, in accordance with the invention as embodied and broadly described herein, a method and apparatus are disclosed in one embodiment of the present invention as including a method for cooking with and supporting a Dutch oven. The method may comprise providing a pan with legs pivotably connected to be moveable between a deployed position and a storage position. Handles secured to the pan by attachments are moveable in translation radially with respect thereto.

One may use the system by deploying the legs from a storage position to a deployed position and extending the handles from a retracted position to an extended position. A grip portion of each handle is thus spaced radially away from the pan a greater distance than in the retracted position. A heat source such as charcoal, wood, embers, a gas burner, or the like is placed in the pan, on a top surface thereof. A Dutch oven, grill, pot, kettle, skillet, griddle, or the like may provide a cooking surface above the heat source.

With a Dutch oven, coals (e.g., charcoal, embers, etc.) will typically be placed on the top surface of the pan as a heat source, but also on the lid of the Dutch oven itself, as a heat source. In contrast, an open grill is open directly to a heat source, whether a burning lignin (wood) material, a gas flame, or a diffuser plate above a gas flame.

Cooking a foodstuff on the cooking surface, whether open or enclosed, may be done in any suitable manner by grilling, boiling, frying, baking, and so forth. Upon completion of cooking and removing the heat source, it may be advisable to wait while the pan cools to a temperature sufficiently low to permit safe handling. At any time one may move the handles from a deployed (extended) to the retracted position, or vice versa, because their connection to the heat of the pan is thermally isolated therefrom by distance and minimal area of connection. Before storing the apparatus, one unlocks the legs followed by folding the legs from a deployed position to a stowed position under the pan.

In some embodiments, the apparatus may include a wind screen or wind break, which may sit on the upper surface of the pan extending vertically around some or all of the circumference to reduce air movement over and across the heat source.

Handles may include a grip portion and two extensions extending from the grip, outboard of the pan, to a rail formed as a boss under the pan, securing each extension with a keeper or securement member holding the extension portion to a base aligning the rail with respect to the pan. The base may be formed as part of the pan, such as by casting, or attached during fabrication by fasteners, welding or the like. The rail secured to the base and extending downward away therefrom fits into a slot in the respective handle, fitted to slide along the rail. The keeper securing the rail within the slot may act as a cap bolted to the rail and too wide to pass through the slot in the extension of the handle.

Manufacturing may involve casting the pan from a molten metal such as iron or aluminum, and may include casting brackets into a lower side or surface of the pan. The brackets are formed to match the legs, each bracket hinging a leg pivoting about a pin with respect to the pan. Casting the "stops" near the brackets effectively forms a registration position controlling the deployed position of each leg corresponding thereto.

A wind screen may be formed in segments, matingly fitted to secure to one another. A grill fitted to be supported by and above the windscreen may be adjustable in slots formed in the windscreen. Two, three, or even four segments may be fitted to quickly attach together to form the windscreen, and may be as easily taken apart, once cooled sufficiently.

A pot, such as a Dutch oven, placed on or above the heat source may include a lid fitted to the pot. Storage for removing the lid from the pot may be provided by placing the lid on a handle in an extended position. Placing cooking utensils on another handle opposite keeps the utensils off the ground and ready at hand.

The apparatus may serve as a stand or small table, with the pan formed to contain a heat source and support a Dutch oven or other cooking implement. With the handles permanently secured to the pan to remain permanently therewith, the handles may be easily translatable between a first stowed position wherein grips of the handles are positioned proximate the pan, and a second deployed position wherein the grips of the handles are positioned away from the pan.

Legs pivotably secured to the pan may move between a first stowed position thereunder and a second deployed position extending downward from the pan. By extending the legs to the deployed position, extending the handles to the extended position, and providing a source of heat on the pan, a Dutch oven may be used for baking or roasting over the source of heat. Locking the legs in the deployed position may be as simple as pressing a button to release a detent or pin extending between a leg and a mounting bracket of flanges formed on the bottom surface of the pan.

The handles have a grip portion that may be somewhat arcuately formed to extend along the circumference of the pan, when the pan is circular, even somewhat spherical, as a portion of a spherical shell. The extension portions of the handles may each be formed monolithically with the grip portion extending between them. The handle may be formed by a suitable method, such as by stamping, to form the shape, all cuts, a stiffening rib extending perpendicularly away from each extension, and the slots cut during the process. Thus, each extension portion may comprise an elongate, monolithic piece homogeneously formed unitarily with the grip and opposite extension, provided with an elongate aperture for receiving a stud or rail. The rail may extend from the pan to hold the extension as a sliding member, secured by a keeper, the extension being captured permanently between the pan and the keeper to secure the handle to the pan.

The source of heat may be selected from wood, a wood product, charcoal, a volatile liquid, a combustible gas, or the like. Packing the stand, windscreen segments, and grill proximate one another, the system may be fit into a spatial envelope circumscribed by a circle having a diameter not larger than the distance between the outer extremities of the grips of the handles in the stowed position.

BRIEF DESCRIPTION OF THE DRAWINGS

The foregoing features of the present invention will become more fully apparent from the following description and appended claims, taken in conjunction with the accompanying drawings. Understanding that these drawings depict only typical embodiments of the invention and are, therefore, not to be considered limiting of its scope, the invention will be described with additional specificity and detail through use of the accompanying drawings in which:

DETAILED DESCRIPTION OF THE PREFERRED EMBODIMENTS

Figure 1:
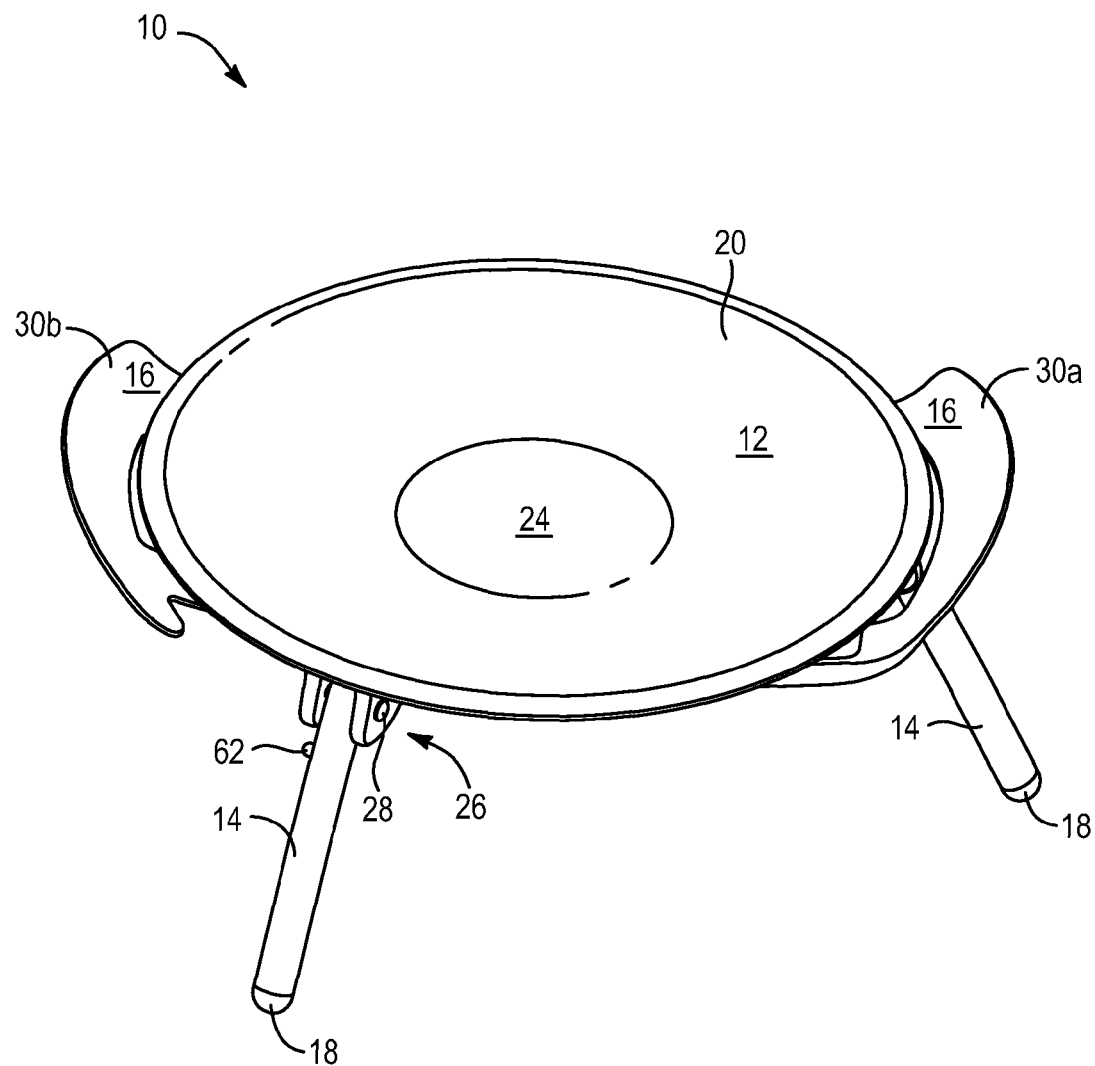
FIG. 1 is a top perspective view of an apparatus in accordance with the invention.

It will be readily understood that the components of the present invention, as generally described and illustrated in the drawings herein, could be arranged and designed in a wide variety of different configurations. Thus, the following more detailed description of the embodiments of the system and method of the present invention, as represented in the drawings, is not intended to limit the scope of the invention, as claimed, but is merely representative of various embodiments of the invention. The illustrated embodiments of the invention will be best understood by reference to the drawings, wherein like parts are designated by like numerals throughout.

Figure 2:
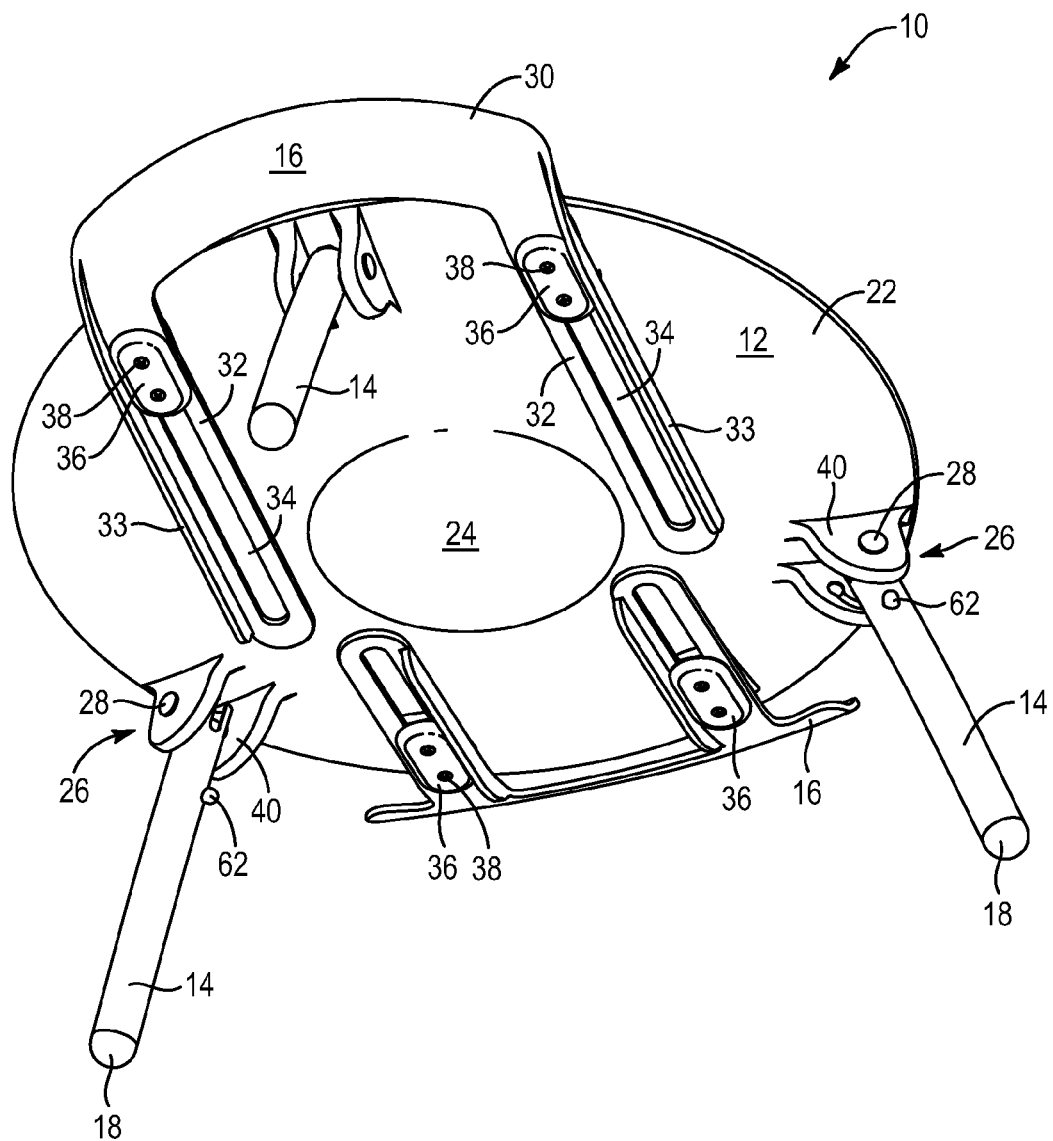
FIG. 2 is a bottom perspective view of the apparatus of FIG. 1.
Figure 3:
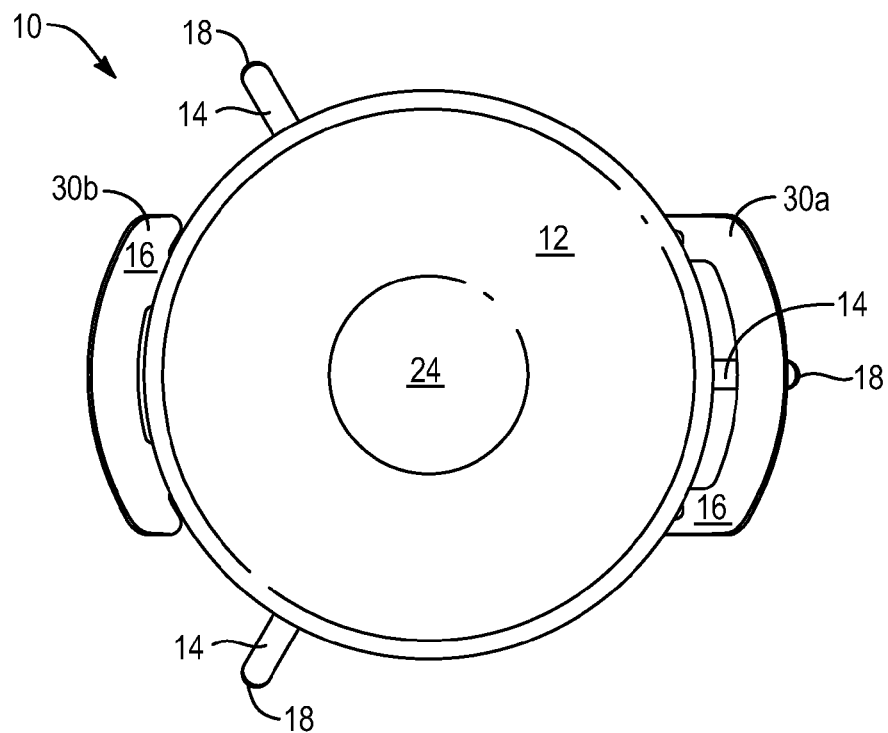
FIG. 3 is a top plan view thereof.
Figure 4:
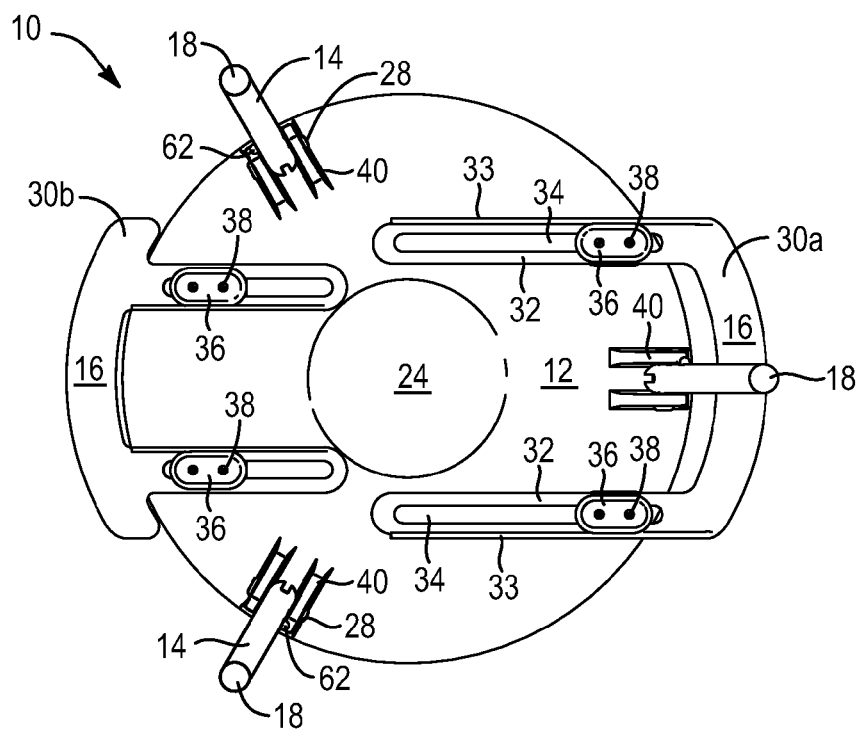
FIG. 4 is a bottom plan view thereof.
Figure 5:
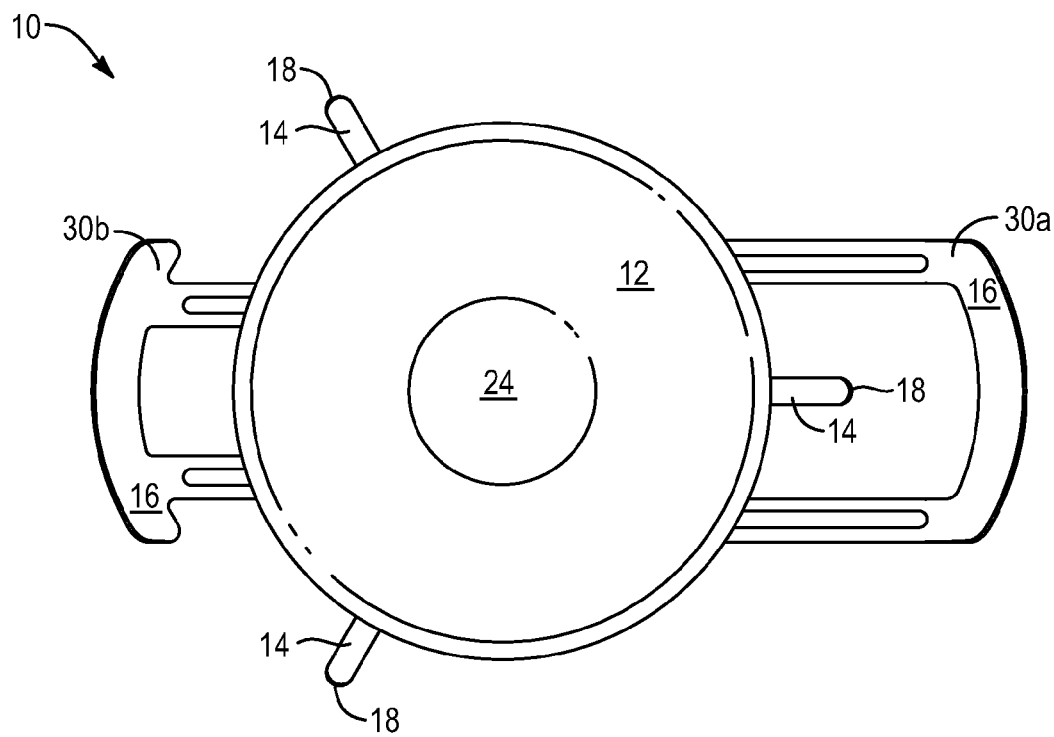
FIG. 5 is a top plan view of the apparatus of FIG. 1 having the handles drawn out into their extended position.
Figure 6:
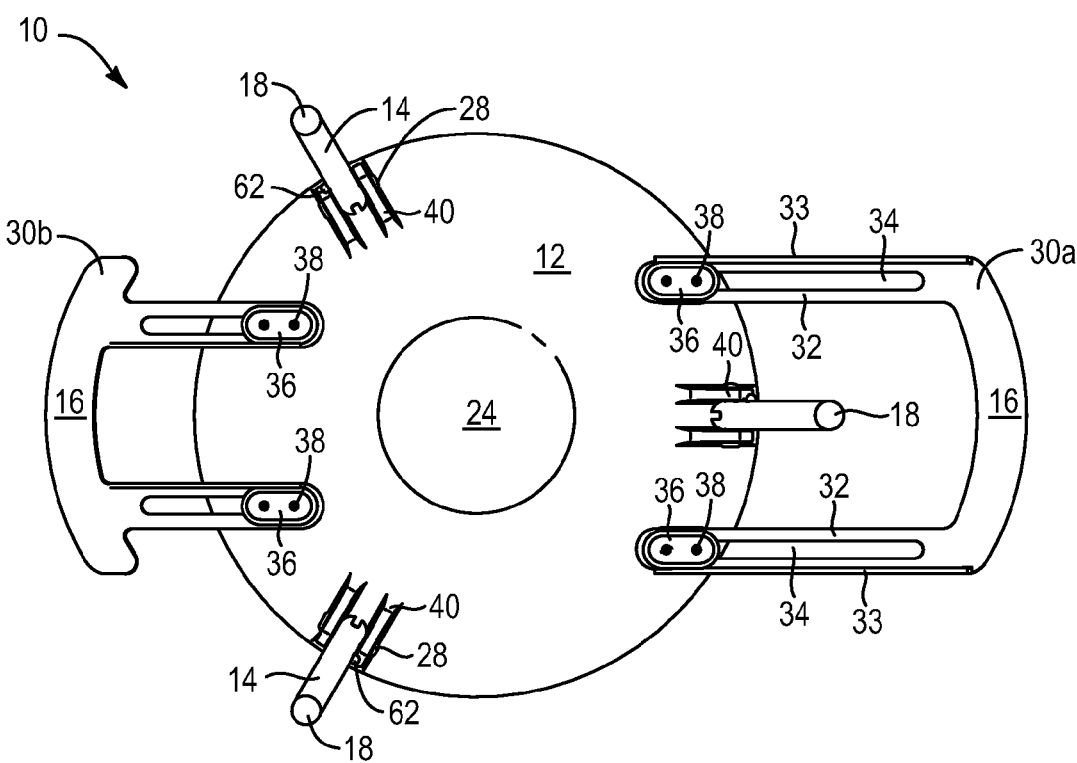
FIG. 6 is a bottom plan view of the apparatus and configuration of FIG. 5.
Figure 7:
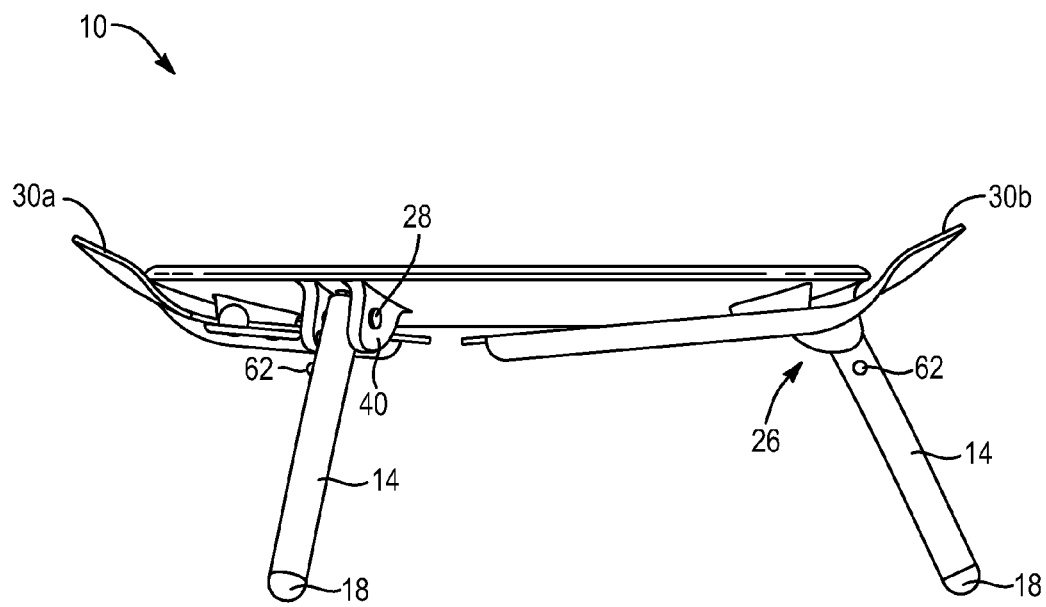
FIG. 7 is a left side view of the apparatus of FIG. 3.
Figure 8:
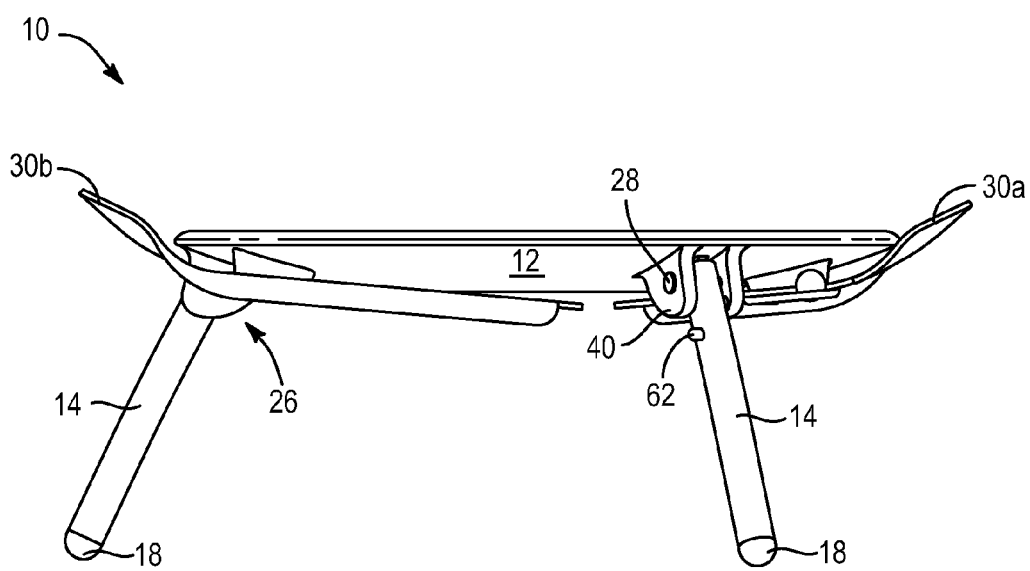
FIG. 8 is a right side view thereof.
Figure 9:
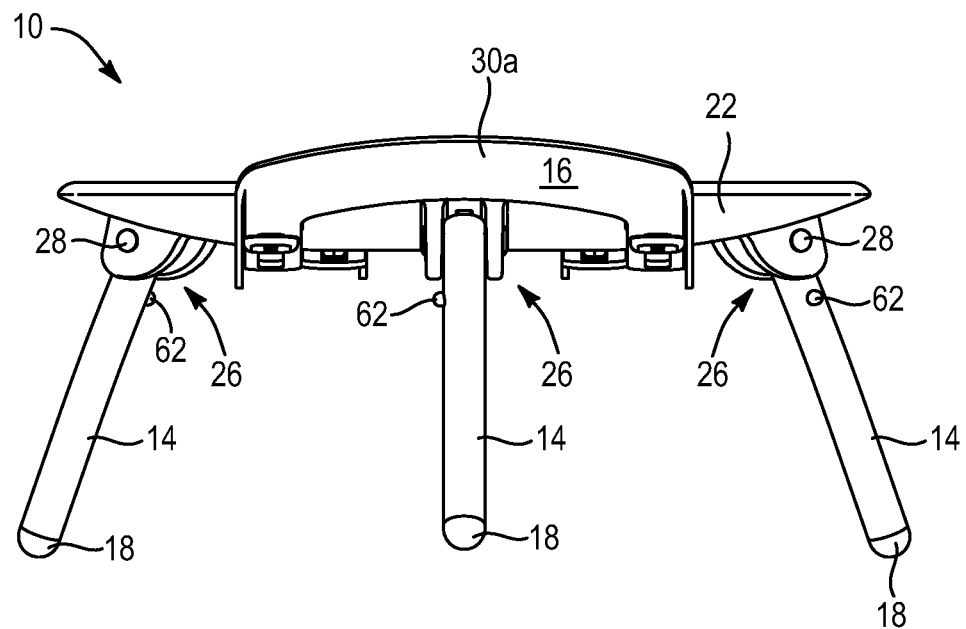
FIG. 9 is a front elevation view of the apparatus of FIG. 3.
Figure 10:
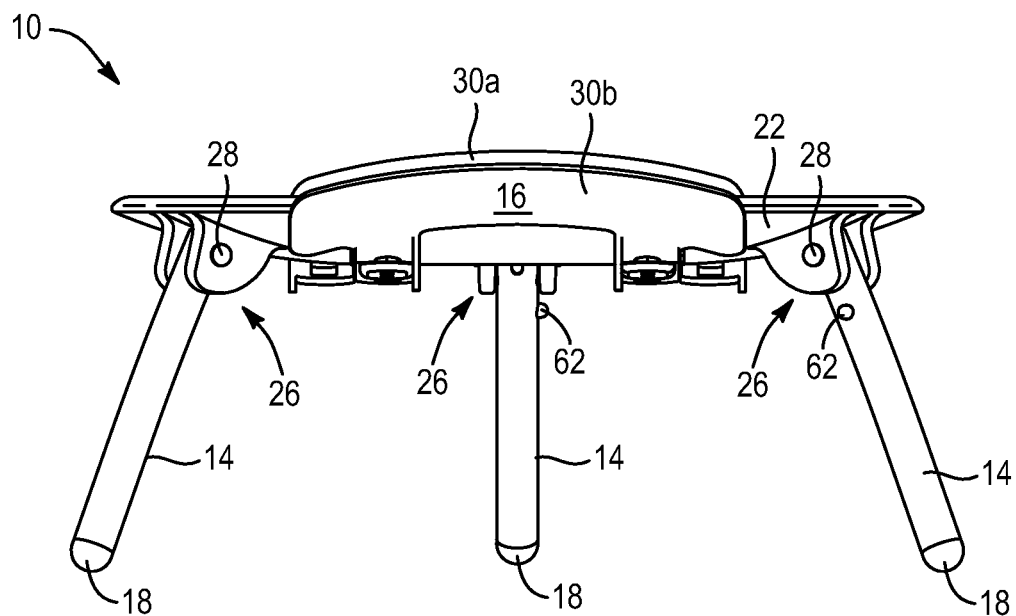
FIG. 10 is a rear elevation view thereof.
Figure 11A:
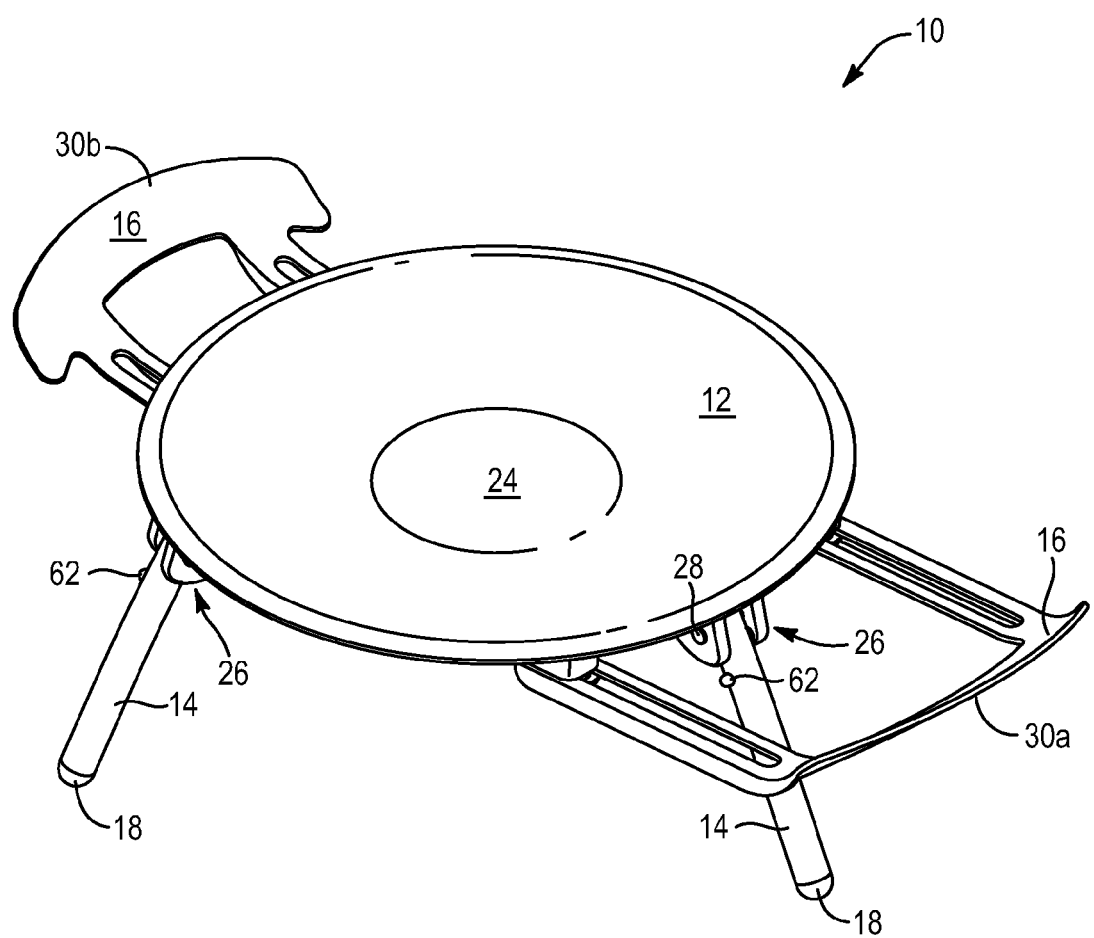
FIG. 11a is a perspective view of the apparatus of FIG. 3 having the handles extended.
Figure 11B:
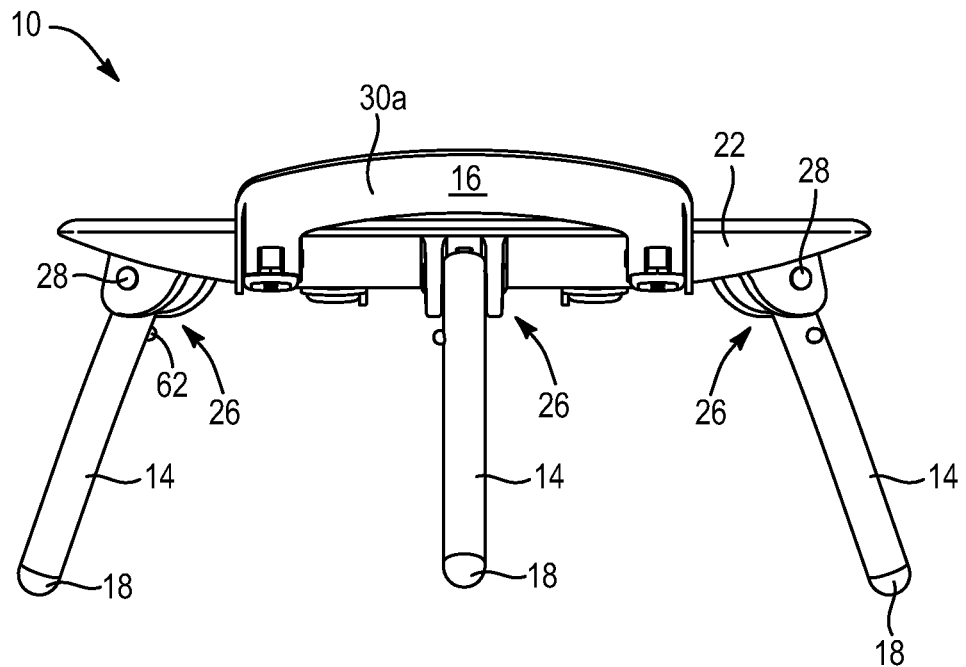
FIG. 11b is a right side elevation view thereof.
Figure 11C:
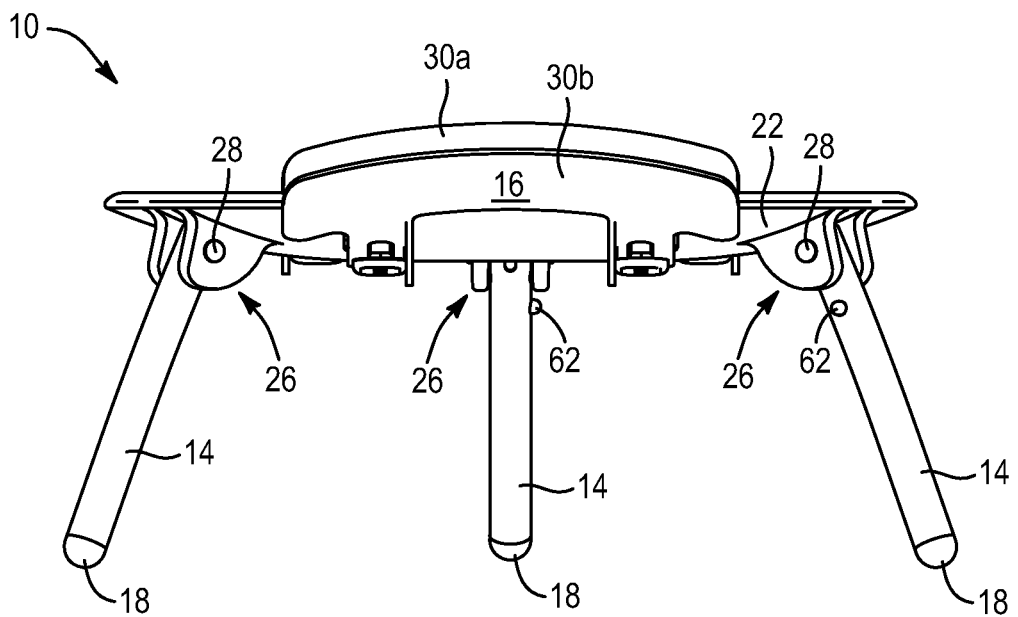
FIG. 11c is a left side elevation view thereof.
Figure 11D:
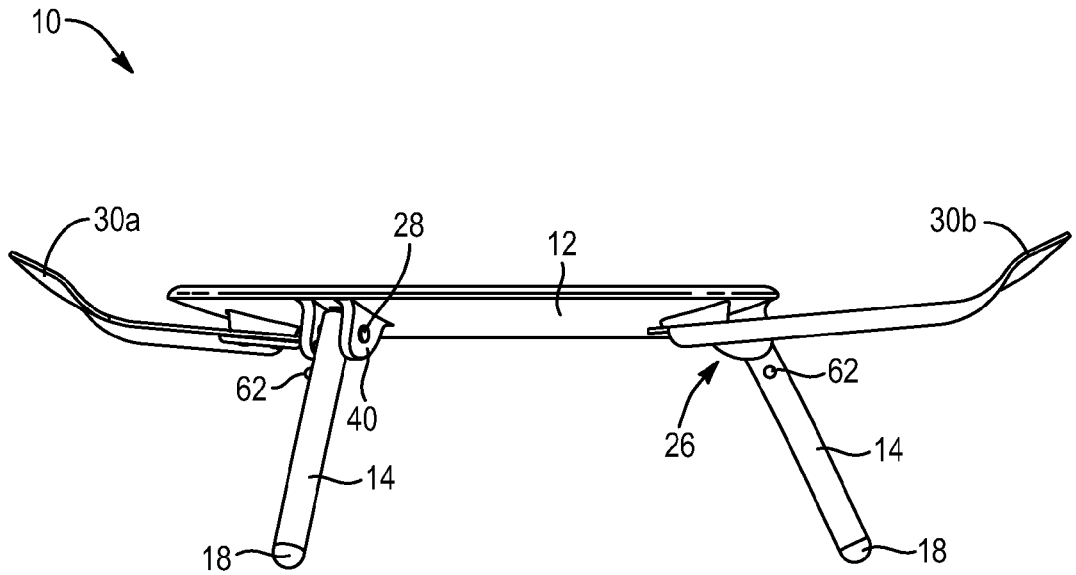
FIG. 11d is a front elevation view thereof.
Figure 11E:
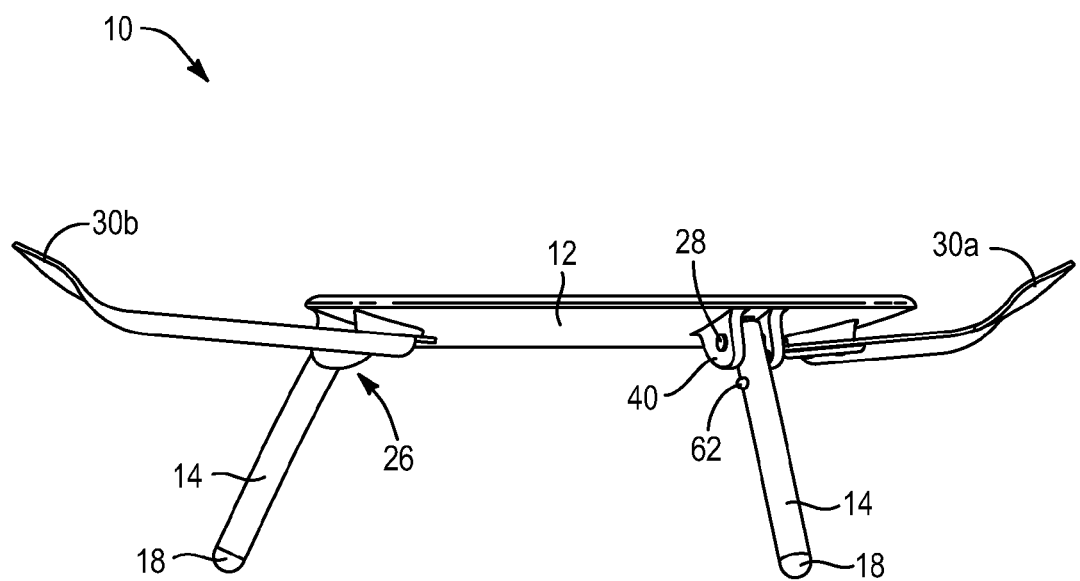
FIG. 11e is a rear elevation view thereof.

Referring to FIGS. 1-12, and particularly to FIGS. 1-2, an apparatus 10 or system 10 in accordance with the invention may include several mechanical pieces attached together to form an apparatus 10 for holding a source of heat, such as a burning supply of wood, charcoal, or gas. In one presently contemplated embodiment, a pan 12 or dish 12 may be formed as a plate 12 or bowl 12 of any suitable material adapted to support weight and elevated temperature. In one presently contemplated embodiment, the pan 12 may be formed of a metal such as stamped steel, fabricated steel, cast iron, cast aluminum, fabricated aluminum, or the like.

In the central portion of the pan 12, a fire or other source of heat may be held for cooking. The pan 12 may be shaped to have a somewhat spherical shape, may be partially flat, may be completely flat, or may otherwise be configured in order to provide strength, stiffness, stability of the heat element or burning element, and to support cooking equipment such as pots, kettles, Dutch ovens, or the like. In the illustrated embodiment, the apparatus 10 has legs 14. Typically, the legs 14 provide for ease of stabilizing the apparatus 10 on a surface. Particularly, in an outdoor environment where rocks, other terrain features, and the like may vary substantially even across the extent of the apparatus 10, a set of three legs provides immediate stability.

Handles 16 may extend from opposite sides of the pan 12. In the illustrated embodiment, two handles 16 are formed to stow beside one another as they extend along the bottom surface of the pan 12. The legs 14 may each be provided with a foot 18 in order to improve grip, reduce the incursion of soil and other debris into the end of a leg 14 if it is formed as a hollow, tubular structure, and so forth.

The surface 20 or top surface 20 of the pan 12 may be spaced a substantially constant distance from the bottom surface 22 of the pan 12. The surfaces 20, 22 may be formed as spherical surfaces, flat surfaces, or any combination thereof. It has been found that a substantially spherical surface that is comparatively gentle in slope may serve to work well with burning embers, charcoal, wood, and the like. Moreover, by having a spherical surface 20, the diameter of such a sphere may be chose to be sufficiently large that the surface 20 performs substantially as stable as a flat surface as far as supporting wood, charcoal briquettes, embers, and the like against rolling downward toward the center thereof.

Nevertheless, in order to provide for a more compact shape, a spherical surface 20 may be truncated or terminated at a flat portion 24 near the center portion of the surface 20. The flat portion 24 tends to reduce the overall geometry or envelope (surrounding spatial definition of the dimensions of a surface required to completely circumscribe the extrema thereof). The flat portion 24 may be configured to include any suitable portion of the overall surface 20. For example, about one third or less of the overall diameter of a pan 12, when the pan 12 is circular, has been completely suitable. Of course, charcoal briquettes, embers, wood coals, and the like do not tend to roll on a flat portion 24, which thereby may provide a central area to support such burning members without their displacing readily.

Each leg 14 may be secured to the pan 12 by a bracket 26. In the illustrated embodiment, the brackets 26 may be welded, bolted, or cast in order to secure them to the pan 12. In the illustrated embodiment, the brackets 22 are cast as a part of the pan 12, which is cast with all the hardware locations, bosses, extensions, and the like needed to secure both the handles 16 and the legs 14 to the pan 12.

Each leg 14 may secure to a bracket 26 by a pin 28 or pivot 28. The leg 14 may pivot between deployed and stowed positions about the pin 28 secured in the bracket 26.

A pair of handles 16, likewise may each include a grip 30 or grip portion 30. In the illustrated embodiment, the larger grip 30a is arranged to fit opposite the smaller grip 30b. In this way, the grips 30 being made different sizes may perform different functions. For example, to each grip 30 is connected two extensions 32, either by unitary forming of a homogeneous, monolithic piece of base material, or by fabrication, molding, stamping, or other manufacturing techniques, such that extensions 32 or slides 32 extend away from each grip 30. The grips 30 are sized so their extensions 32 do not interfere with those of the opposite grip 30. Each extension 32 includes a rib 33. In one embodiment, each extension 32 is stamped, thus folding the edge portion of the base material of each extension 32 into the rib 33, while providing also a slot 34 within the extension 32.

The slot 34 may be sized and fitted to secure slidably, thus permitting translation of each grip 30 with respect to the pan 12 or tray 12. In the illustrated embodiment, each extension 32 is secured by a retainer 36 that is sufficiently large that it will not pass through the slot 24. Thus, the retainer 36 secures each extension 32 against the pan 12. Typically, a fastener 38, such as a machine screw, bolt, or other fastener may secure the retainer 36 in place. Typically, multiple fasteners 38 secure the retainer 36 against pivoting, turning, or otherwise moving. Nevertheless, in certain embodiments, a retainer 36 may simply be a round washer secured by a bolt 38, in which the extension 32 is secured to the pan 12.

In operation, the apparatus 10 may be placed in a stowed configuration. Likewise, the stowed configuration may be considered a storage or transport position. Likewise, the apparatus 10 may be set up in a deployed position for use.

Figure 12:
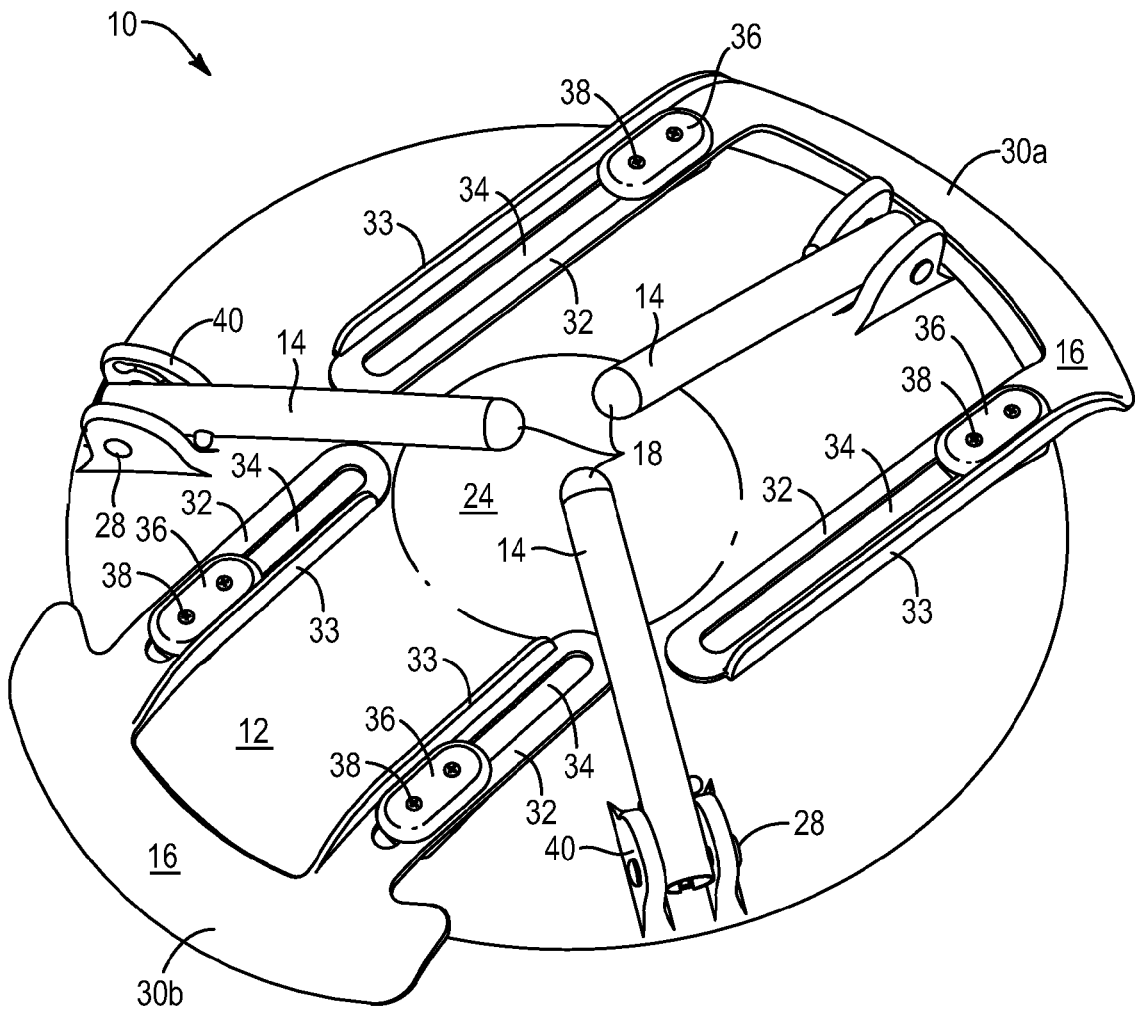
FIG. 12 is a perspective view of the bottom of the apparatus of FIGS. 1-11, having the handles retracted and the legs folded along the bottom thereof.

Referring to FIG. 12, while continuing to refer generally to FIGS. 1-12, the handles in a stowed position may slide in translation under the retainers 36, or between the retainers 36 and the pan 12 in order to move the grips 30 toward one another. The extensions 32 are prevented from interfering with one another by forming the grips 30 to be of different dimensions.

For example, one grip extends along more of the circumference of the pan 12 than the other. Also, by way of example, the grip 30a extends across a greater arc along the perimeter of the pan 12 then does the grip 30b. By the same token, each covering a different arc results in the extensions 32 being spaced from one another a different distance in the case of each grip 30a, 30b. Accordingly, the extensions 32 of the grip 30a extend outboard of the extensions 32 corresponding to the grip 30b.

In the illustrated embodiment, the legs 14 are shown in FIG. 12 in the stowed configuration. Here, each leg 14 is unlocked and folded down against the pan 12, or in close proximity thereto. It may be advantageous for each of the legs 14 to have an arcuate shape adapted to fit closely against the pan 12, the extensions 32 of the handles 16, or both.

To return the apparatus 10 from the stowed or folded position illustrated in FIG. 12, to the deployed position illustrated in FIGS. 1-11, one may draw each leg 14 away from the pan 12, such that the foot 18 thereof is placed at a maximum diameter and distance away from the bracket 26. Similarly, the apparatus 10 may be handled by the grips 30 in the stowed position. However, during use, the grips 30 may be drawn away from the pan 12, by extending the handles 16 to the full extent permissible by the extensions 32 sliding along the rails 54 and retainers 36.

In this way, the grips 30 or the overall handles 16 may extend away from the upper surface 20 of the pan 12. Thus, if charcoal is burning, or a gas flame is burning, in the pan 12, a user may move the apparatus 10 by the handles 16 without the risk of burning fingers in close proximity to the pan 12. Nevertheless, the apparatus 10 may be completely functional with the grips 30 completely in the stowed position even while cooking.

However, an additional benefit to the extensions 32 is that the handles 16 may form holders to support other cooking essentials. For example, the handles 16 provide a support to set a lid down after removal from a pot, Dutch oven, or kettle. Likewise, various implements and utensils may be set down on one of the handles 16, typically across the extensions 32.

In cooking with Dutch ovens 76, the apparatus 10 is particularly convenient. Typically, in Dutch oven 76 cooking, "coals" such as wood embers, charcoal, or the like will be placed under the Dutch oven 76, on the pan 12. However, most of the heat in Dutch oven 76 cooking is heat emanating from the lid 78 of the Dutch oven 76 into the interior. Thus, the lid 78 of a Dutch oven 76 also has embers, charcoal, wood, or the like burning on top of it.

Accordingly, the lid 78 of the Dutch oven 76 will be hot, and should not be set on grass or dirt or other debris on the ground, which would then stick to the bottom surface of the lid 78, and eventually be dropped back into the food in the Dutch oven 76. Likewise, because the Dutch oven lid 78 is hot, it needs to be kept away from surfaces that cannot safely support it. An extended handle 16 provides a convenient location, stable and readily adapted to setting a lid thereon for safety and convenience.

Similarly, with Dutch oven 76 cooking in particular, various implements are typically needed or at least convenient in handling a Dutch oven 76. For example, some type of tongs for handling the embers or charcoal, possibly a spoon, spatula, fork, or other utensil may be advisable. Also, gloves, tools, and the like for handling the lid 78, for lifting the hot oven by a bail, or the like, may be set on the extensions 32 of the handles 16. Thus, an apparatus 10 in accordance with the invention provides a convenient surface 20 for holding the source of heat (gas burner, charcoal, embers, wood, etc.) but also supports the weight of a Dutch oven 76.

For example, a Dutch oven 76 has three legs, and is formed of a cast material, typically cast iron or cast aluminum. The legs of a Dutch oven 76 provide for stability of the Dutch oven 76, as well as providing access to air for the heat source therebelow. Charcoal briquettes continue to burn well when permitted access to oxygen. Moreover, the burning embers or charcoal will also provide radiation heat transfer to the lower surface of the Dutch oven 76.

If the Dutch oven 76 did not have legs, it would have to have some other support, or else sit on the coals, thus restricting their access to air. By having a spherical shape to the pan 12, a Dutch oven 76 may be adjusted in order to keep the Dutch oven 76 level. For example, in cooking cakes, pies, and the like, the need for maintaining a Dutch oven 76 flat may be met partially by adjusting the position of a leg 14. However, it may also be done by moving the legs of the Dutch oven 76 about the spherical portion of a pan 12.

Another benefit of an apparatus 10 in accordance with the invention is the ability to stack Dutch ovens 76 thereon. For example, multiple Dutch ovens 76 will have their respective inherent tare weight of each, as well as the weight of their contents. However, when cooking with a Dutch oven 76, it is often advisable to use the coals on the lid of one Dutch oven 76 to heat the bottom of the Dutch oven 76 sitting thereon. Thus, the legs of an upper Dutch oven 76 may rest on the lid of a lower Dutch oven 76. In the illustrated embodiment, the pan 12 is sufficiently robust in thickness, diameter, and in overall spherical dimensions that it provides sufficient stiffness and support for a stack of Dutch ovens 76.

For example, if the pan 12 is made to be completely flat, it will best operate if provided with a lip or rim at the circumference or at the edge of the circumference thereof. However, if made in a more spherical shape, then the section modulus, as that term is understood in engineering, is greatly increased, improving the stiffness, strength, and the ability of the pan 12 to support more weight. Thus, the pan 12 may support a stack of several Dutch ovens 76, each stacked on the lid 78 of the Dutch oven 76 therebelow, in order to provide a multi-course meal.

Figure 13:
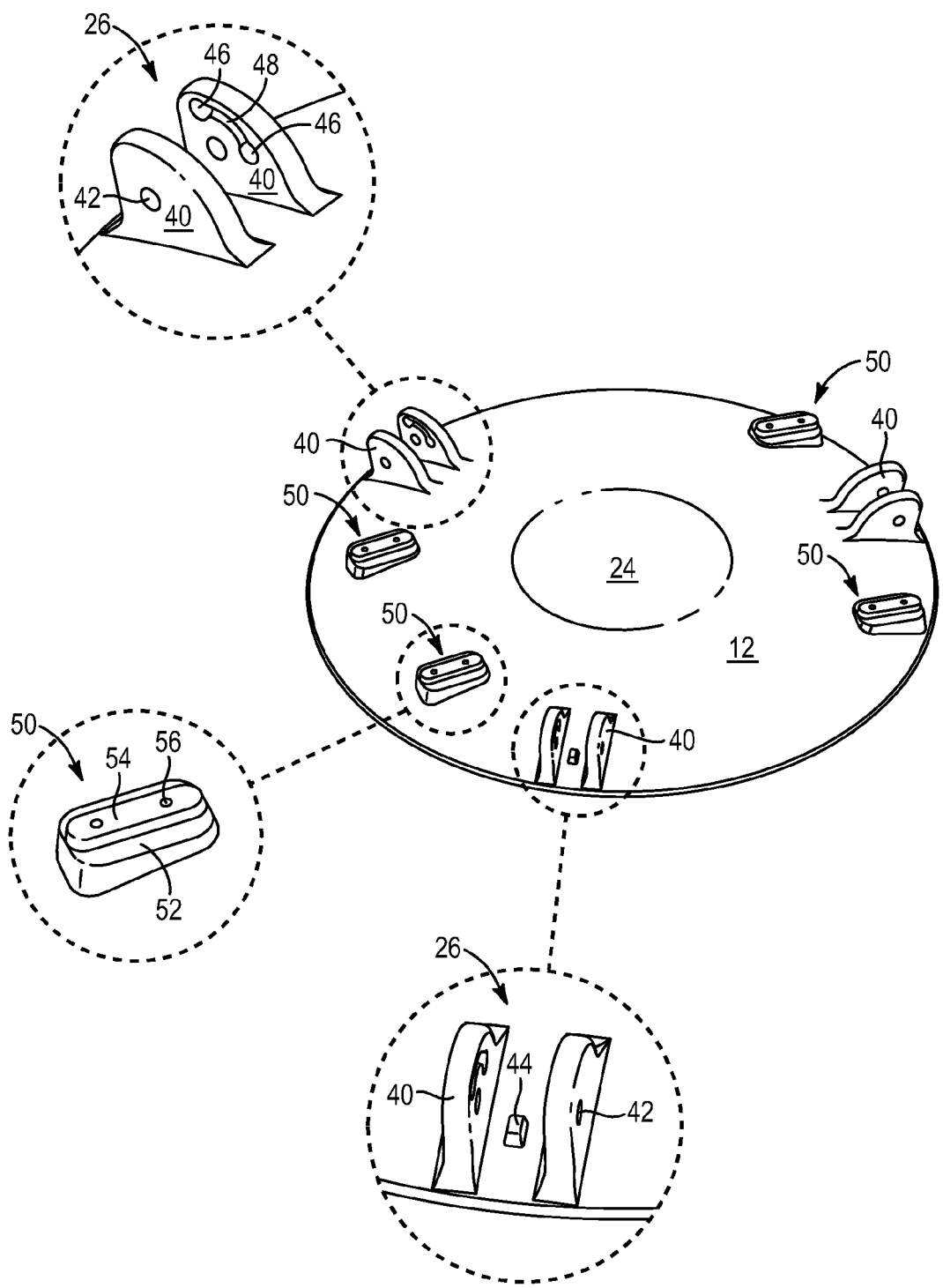
FIG. 13 is a perspective, exploded view of the bottom of the apparatus of FIGS. 1-12, showing the attachment mechanisms formed into the main dish of the apparatus.

Referring to FIG. 13, while continuing to refer generally to FIGS. 1-19, an apparatus 10 in accordance with the invention may be formed with the pan 12 having flanges 40, each provided with an aperture 42 to receive the pin 28 required to pivotably secure a leg 14 between the flanges 40 forming the bracket 26. In the illustrated embodiment, the flanges 40 may be cast simultaneously with the overall structure of the pan 12, thus providing additional integrity, reduced manufacturing cost, manufacturing operations, labor, and so forth. Moreover, by casting the pan 12 with the flanges 40 already designed therein, the cost and complexity of manufacturing operations may be reduced.

One advantage found in the illustrated embodiment, wherein the pan 12 is cast with the flanges 40 as an integral, homogeneous, simultaneously cast portion thereof (formed of the same material), is that the need for measurements, alignment, and the like is reduced. For example, a flange 40 cast with the pan 12 is formed every time in exactly the same and correct position, rather than being measured, welded, or otherwise secured, and then having to be checked for proper alignment after assembly. Thus, the additional measurements, the additional process steps, the additional chances for error are all eliminated by casting the flange 40 as an integral, homogeneous part of the pan 12.

With each flange 40 positioned opposite another flange 40, and having apertures 42 in each aligned to receive the pin 28, each leg 14 is secured in two dimensions (orthogonal directions), but is free to pivot in the third. Accordingly, when the leg 14 is in the fully deployed position, it is configured to touch on a stop 44, also formed between each pair of flanges 40. The stop 44, just as the apertures 42 of the flanges 40, may be machined if necessary. However, it is possible, and has been found suitable, to cast the stop 44 and the flanges 40 with the pan 12, and require no additional machining to fit them, size them, or do final finish. Rather, the stop 44 stops the motion of each leg 14, providing additional stability therefor.

Likewise, each flange 40, or rather each pair of flanges, is provided with a pair of receptacles 42 in at least one of the flanges 40 of a pair. Between the receptacles 46 runs a track 48. The receptacles 46 correspond respectively to the deployed position of a leg 14, and the stowed position of a leg 14.

The slots 34, corresponding to the extensions 32 of the handles 16, translate, sliding along guides 50. Each guide 50 has a base 52 secured to the bottom surface 22 of the pan 12. In the illustrated embodiment, the base 52 is cast as a monolithic, homogeneous part of the pan 12. On the top of the base 52, when the pan 12 is in the upside down position as illustrated in FIG. 13, a rail 54 runs along the base 52.

Again, the rail 54 may be homogeneously cast with the base 52 as part of the pan 12. However, the rail 54 may be machined to provide a more precise fit with the slot 34 of an extension 32 or slide 32. Nevertheless, with sufficient precision of the casting of the rail 54, as a boss 54 extending away from the base 52, the extensions 32 may slide along the respective rails 54 without any machined fit.

Meanwhile, the retainers 36, or the retainer 36 corresponding to each rail 54 may be provided with one or more apertures 56. In the illustrated embodiment, two apertures 56 ensure that the retainer 36 does not rotate about the fasteners 38. Nevertheless, in certain embodiments, the retainer 36 could be a washer, and thus simply retain the respective extension 32 or slide 32 sliding with respect to the rail 54 to which the retainer 36 secures that slide 32. The apertures 52 may be threaded, or may be left for the fasteners 38 to "self tap" into.

In one presently contemplated embodiment, the apertures 56 are simply drilled into the rails 54 after casting, and are not formed as a part of casting. Nevertheless, it may be convenient to provide a small aperture 56 or dimple, which may be drilled into a larger aperture 56, thus making the centering and locating of the apertures 56 more simple and predictable in a manufacturing environment.

Figure 14:
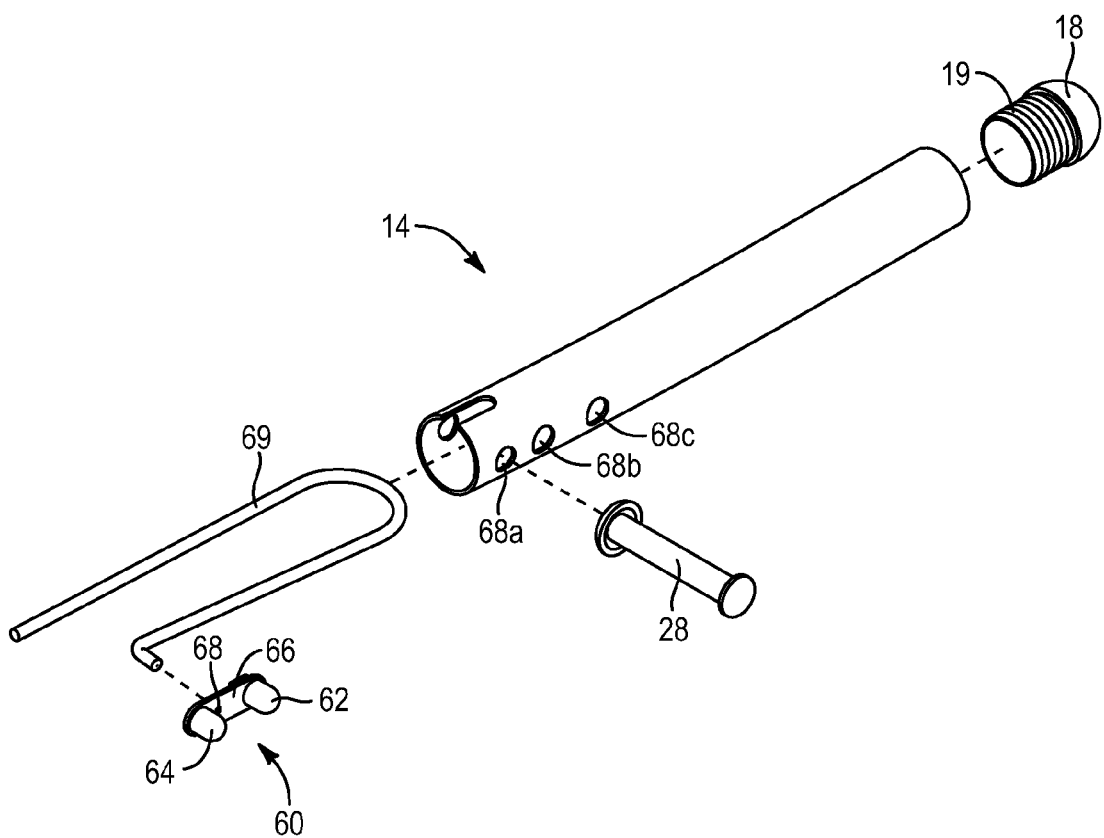
FIG. 14 is an exploded view of the leg assembly of the apparatus of FIG. 1.
Figure 15:
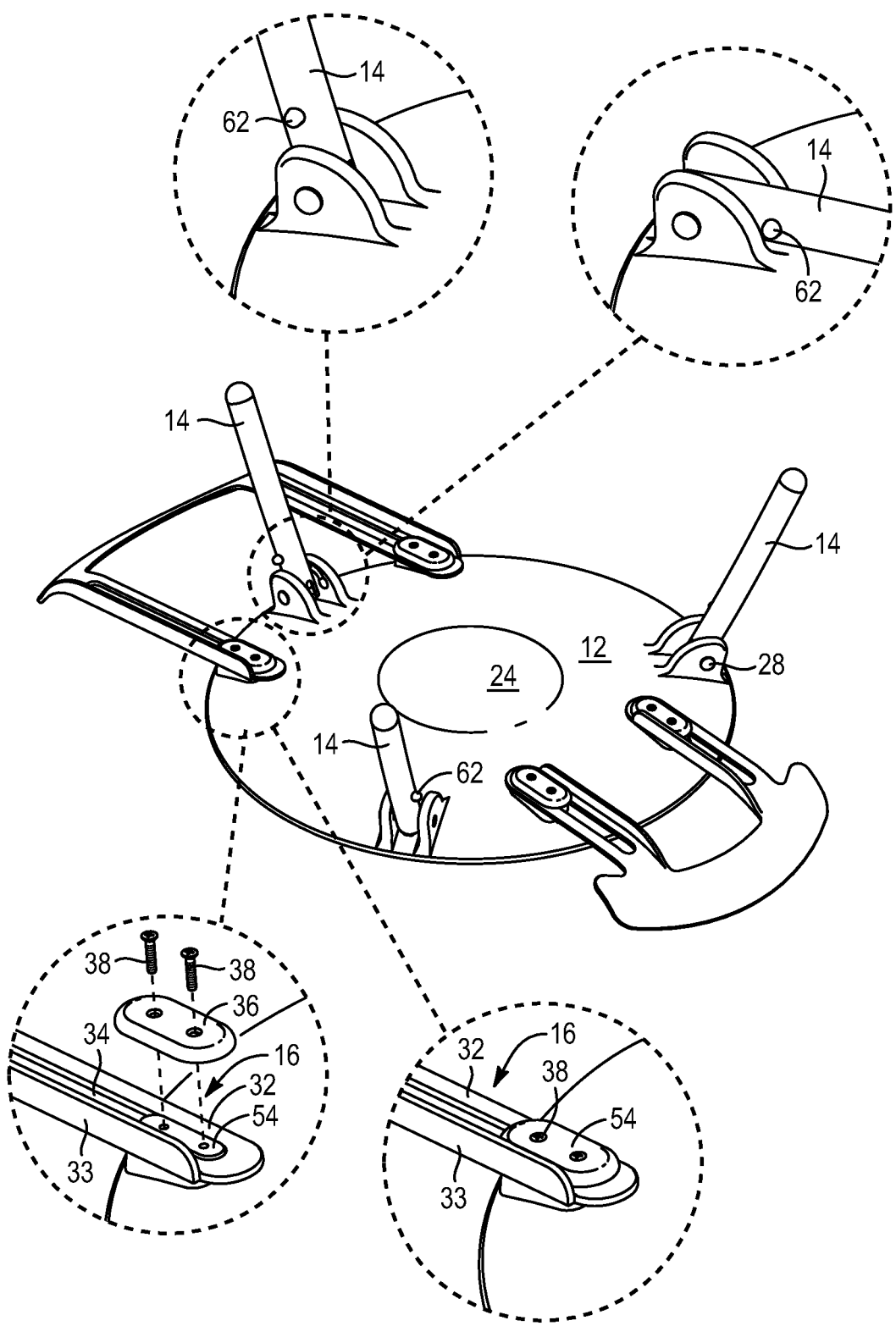
FIG. 15 is a bottom perspective view of the dish portion of the apparatus of FIG. 1, this showing the operation of the leg retraction and extension, as well as the assembly of the retainers securing the handles thereto.
Figure 16:
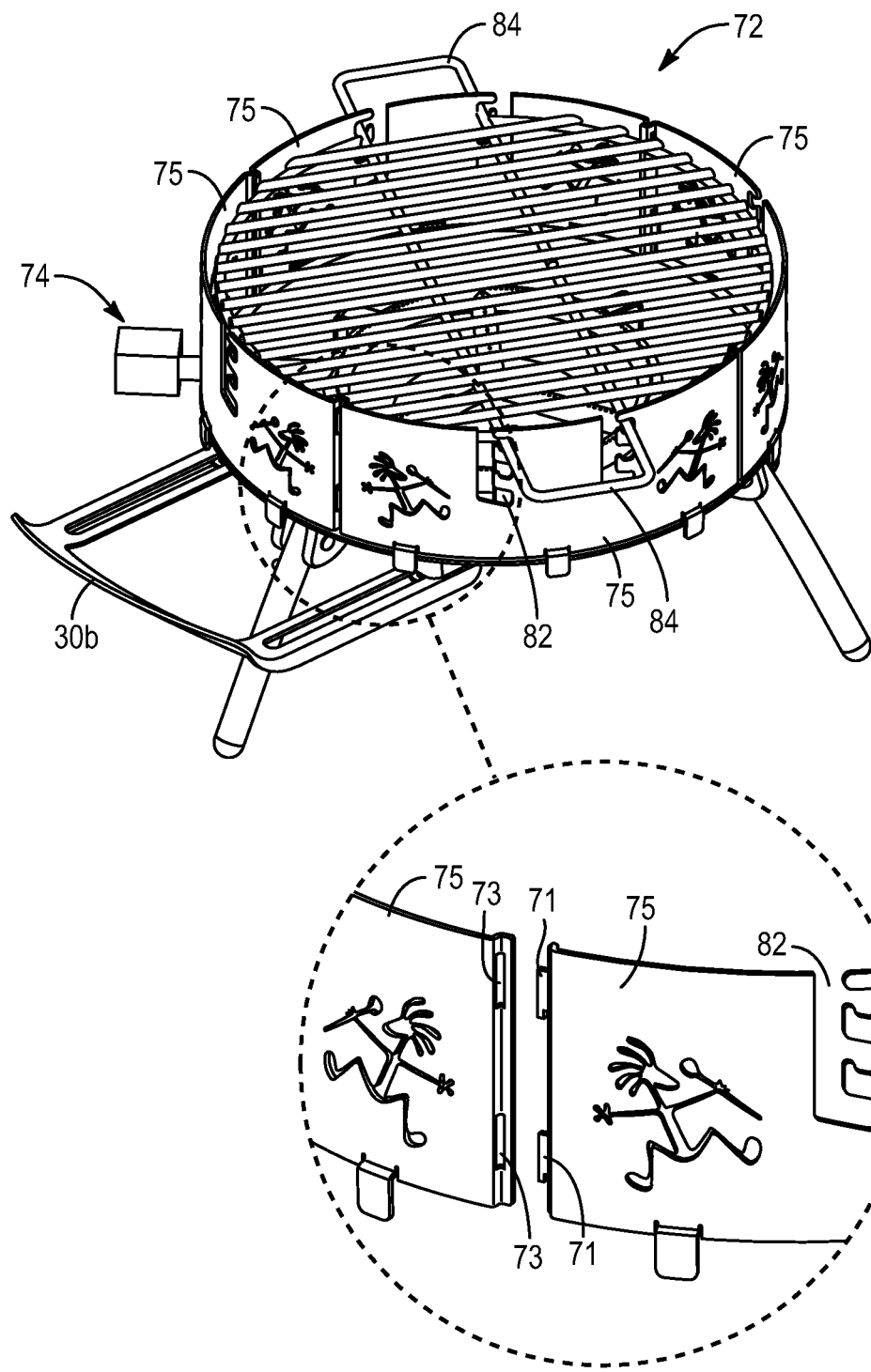
FIG. 16 is a perspective view of one embodiment of the apparatus of FIG. 1, including a wind guard, grill, and a gas burner unit, all optional accessories to be used with the apparatus of FIG. 1.
Figure 17:
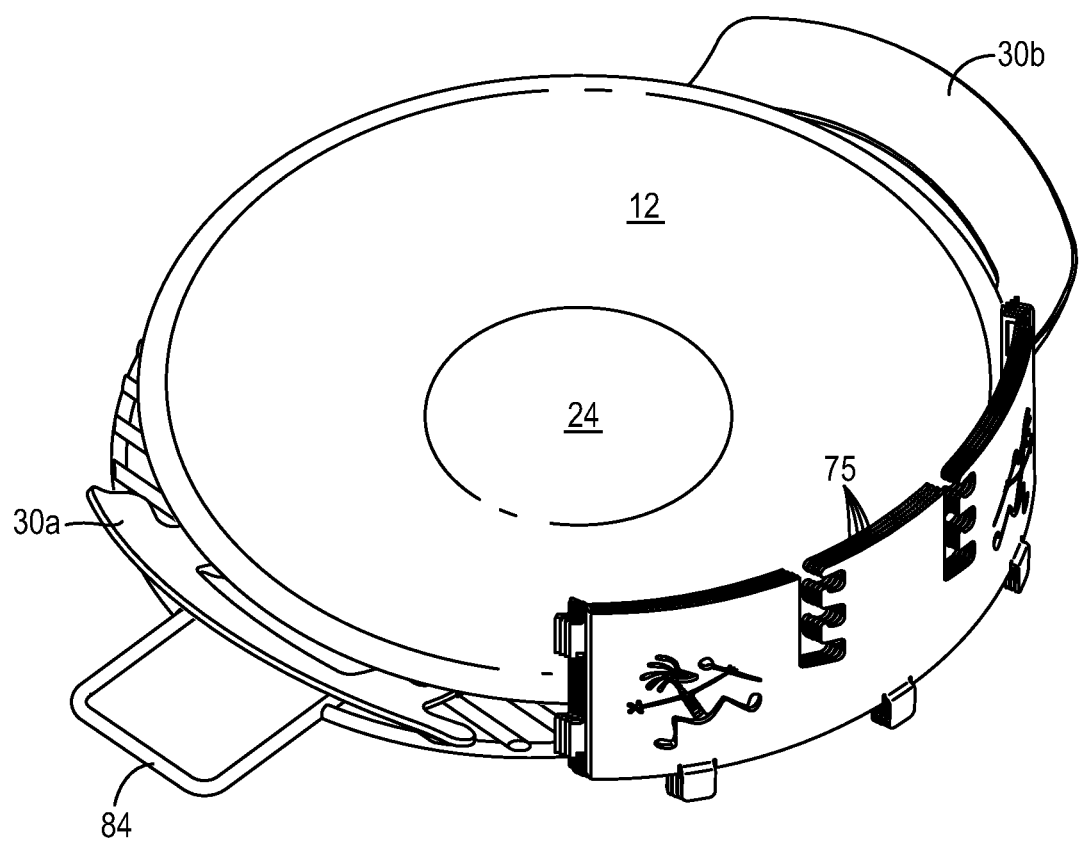
FIG. 17 is a top perspective view of the configuration of FIG. 16, disassembled, and placed together in a kit for storage.
Figure 18:
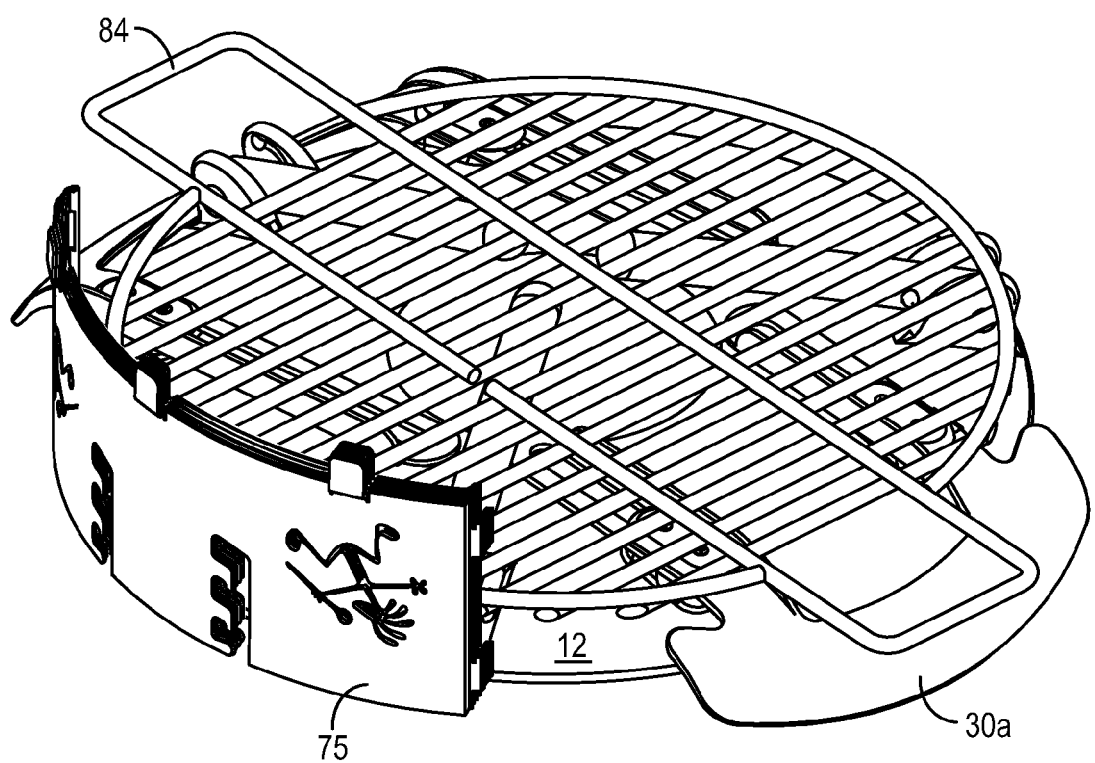
FIG. 18 is a bottom perspective view of the disassembled apparatus of FIG. 16.

Referring to FIGS. 14-15, while continuing to refer generally to FIGS. 1-19, a lock 60 for the leg 14 secured to a pan 12 may include a button 62 and pin 64 formed with a beam 66. The button 62 extends out through the tubular leg 14 to be accessible to a user. Thus, by a user depressing the button 62, the beam 66, and with it the pin 64, is pushed into the interior of the leg 14. In the illustrated embodiment, the button 62 extends out through one of the apertures 68.

The trailing letters after reference numerals herein simply show instances of the item identified by the reference numeral. Accordingly, each of the apertures 68, can be separately identified by its reference 68a, referring to the aperture 68a that receives the pin 28, while the aperture 68b receives the pin 64 that effects locking of the lock 60. Meanwhile, the button 62 that effectively actuates movement of the pins 64 within its aperture 68b, extends out through aperture 68c for availability to a user.

In use, the lock 60 relies on a spring 69 within the interior of the leg 14 to urge the beam 66 against the tubular leg 14. Thus, a small hole in the beam 66, and a yoke to orient the beam 66 against the spring 69 are illustrated. When a user depresses the button 62 into the aperture 68c corresponding thereto, the spring is depressed, moving the entire beam 66, and consequently the pin 64 also. Thus, the button 62 disappears into the aperture 68c, causing the locking pin 64 to disappear into the aperture 68b corresponding thereto.

The pin 64 travels between the receptacles 46, along the track 48. Captured in each respective receptacle 46, the pin 64 locks the leg 14 in position for stowing or deploying. To operate the lock 60, a user may depress the button 62 into the aperture 68c in order to retract the pin 64 into the aperture 68b. Thereupon, the user may pivot the leg 14 about the pin 28 through the aperture 68a either into a deployed or stowed position.

A user may release the button 62 as soon as the leg 14 has been pivoted such that the locking pin 64 is out of registration with the receptacle 46 in which it was held. Thereupon, the track 48 presents no obstacle, and the pin 64 slides along the track 48, until arriving at the opposite receptacle 46 from which is started. Upon arriving at the receptacle 46, the pin 66 is urged by the spring 69 into the arrival receptacle, thus locking the leg 14 against any pivoting in either direction from then on, absent operation of the button 62 again.

The foot 18 may include a shank portion 19 sized to fit within a tubular leg 14. In certain embodiments, the foot 18 may be formed of an elastomeric material tending to grip against a surface. This provides additional lateral stability against movement of the apparatus 10 once it is set up. Similarly, in other embodiments, the foot 18 may simply be designed to seal the distal end of each leg 14, in order to prevent debris from entering, accumulating, or otherwise being captured during use. Thus, the foot 18 may be of any suitable shape.

In the illustrated embodiment, the foot 18 is spherical in shape, in order to provide a stable contact on its spherical outer surface almost regardless of position of the leg 14 with respect to a surface, stone, or other support thereunder. Likewise, in one presently contemplated embodiment, the foot 18 is formed of an elastomeric material that tends to grip, thus providing stability against jostling in a lateral direction on a table or other supporting surface.

Referring to FIG. 15, in addition to the operation of the lock 60 as shown in the exploded view of FIG. 14, the details of FIG. 15 also illustrate the assembly of the retainer 36 on the rail 54, secured by the fasteners 38. Machine screws have been found to provide a suitable fastening mechanism, with appropriate strength, and stability. Likewise, they stand up to the rigors of heat and mechanical forces.

Referring to FIGS. 16-19, wind is a factor in combustion. An aggravating factor in cooking with wood products, whether wood coals, charcoal, pieces of wood burning to embers, or even flaming wood, is the lack of control introduced by the presence of uncontrolled wind. In the illustrated embodiment of FIGS. 16-19, a pan 12 may be provided with a wind screen 70 formed to fit around the perimeter of the pan 12. In the illustrated embodiment, the wind screen 70 is provided with mating extensions 71 formed to fit within apertures 73 to support a grill 72. In the illustrated embodiment, the extensions 71 slide into the apertures 73, after which the segment of the wind screen 70 to which the extensions 71 pertain drops into position, thus restraining the segments, adjacent to one another, from separating.

Figure 19:
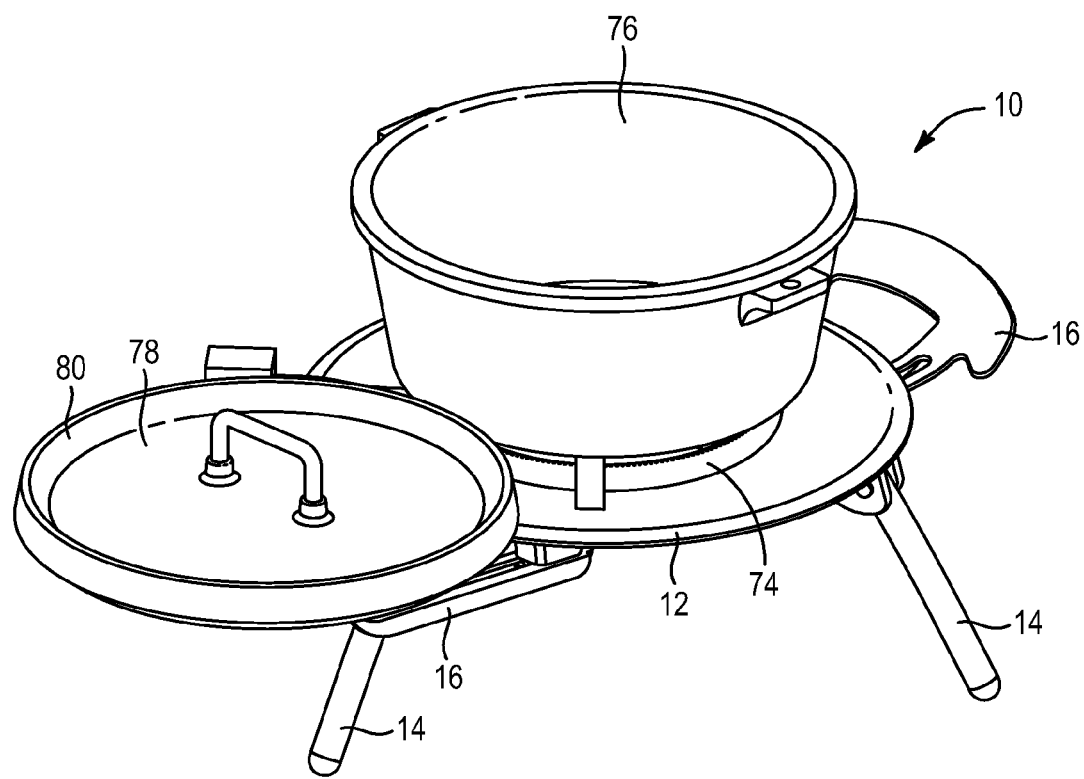
FIG. 19 is a perspective view of the apparatus of FIG. 1, deployed to have a Dutch oven or pot positioned thereon, and a lid supported by a handle of the apparatus, and also including the optional gas burner unit, which may be replaced by fire, wood, charcoal, and so forth.

Thus, without tools, two or more segments of the wind screen 70 may be secured to one another in order to provide a partial or complete circumference of the pan 12. In the illustrated embodiment, the segments 75 of the wind screen 70 complete a full 360 degrees of circumference of the tray 12, or pan 12, which is circular in this illustrated embodiment. In other embodiments, the pan 12 may be rectangular or some other shape. However, Dutch ovens are round and the round configuration illustrated provides improved compactness in the stowed configuration for the apparatus 10. As illustrated, the grill 72 may fit above a burner 74, wood, charcoal, embers, or other coals heating food on the grill 72. In the illustration of FIG. 19, the wind screen 70 is removed. The wind screen is optional, as is the burner 74 for gas.

Regardless of the source of heat, a Dutch oven 76 or other pot 76 may sit on the pan 12, above the source of heat. The wind screen 70 may fit around the Dutch oven 76 in order to reduce the effective wind on the burn rate of the coals (charcoal, wood embers, etc.) of the source of heat for the Dutch oven 76. One will also note that the extended handles 16 provide a location for storing a lid 78 while preparing or while cooking.

The lid 78 has a lip 80 in order to contain coals on the top surface of the lid 78. Accordingly, the lid 78 may be set on a handle 16 with hot coals burning on the lid 78, and held from falling off by the outer lip 80. Also, one will note in FIGS. 16-17, that elevation slots 82 are also provided for securing the handle 84 of the grill 72 therein. Each of the slots provides a different level of the grill 72 above the upper surface 20 of the pan 12.

In some embodiments, charcoal being a favored material for cooking in Dutch ovens may be set directly on the upper surface of the pan 12. However, to insulate the pan 12 from the heat burning the coals, one may provide a layer of diatomaceous earth, commonly known as shop oil absorbent or kitty litter on the upper surface 20 of the pan 12. a quarter to half inch layer of such a clay-like, granular material provides insulation, thus assuring that less heat is translated into the pan 12, and to the ground, grass, or surface below on which the legs 14 rest. Likewise, such a coating reduces the temperature to which the pan 12 is exposed, reducing the time required to cool down after the fire (coals) may be removed after cooking.

A process for using an apparatus 10 in accordance with the invention may include providing a pan 12, legs 14 pivotably connected to the pan 12 and moveable between a deployed position and a storage position, and handles 16 secured to the pan 12. This may include providing attachments securing the handles 16 to the pan 12 to be moveable in translation with respect thereto.

Use may include deploying the legs 14 from a storage position to a deployed position. This may require actuating a lock 60 to release each leg 14 to pivot. Regardless of whether the legs 14 are arranged to lock in the stowed or storage position, they should lock in the deployed position for safety. Once each leg 14 is released to pivot into the deployed position, the locks 60 will typically lock again in the deployed position. This typically happens automatically once the leg 14 reaches a stop 44, registering the leg 14 in the deployed position.

Use is best served by extending the handles 16 from a retracted position to an extended position, wherein a grip 30 portion of each handle 16 is spaced away from the pan 12 a greater distance than in the retracted position. One may at any time move the handles 16 to the extended or deployed position, retracted or storage position, or any position therebetween. Extended, the handles 16 provide protection against heat and a place for supporting lids and utensils.

By providing a heat source on a top surface 20 of the pan 12 and a cooking surface above the heat source one may cook a foodstuff on the cooking surface. A heat source may be any source or fire, whether flaming or radiating, and may include a grill 72, diffuser plate, etc. A cooking surface may likewise be simple or complex, from an open grill 72, to a skillet, enclosed pot, Dutch oven 76, or the like.

After cooking, one may remove the heat source, waiting while the pan 12 cools to a temperature sufficiently low to permit safe handling. One may then, or at any time move the handles 16 to the retracted or storage position. Folding the legs 14 from a deployed position to a stowed position may require actuating a lock 60 to release the legs 14 for pivoting with respect to the brackets 26 (e.g., flanges 40 flanking each leg 14 and holding the pivot pin 28 through all three). The legs 14 may be curved to fold up close to the bottom surface 22 of the pan 12, making a compact envelope (spatial volume circumscribing the system).

If a wind screen 70 is included, one may set the wind screen 70 on the upper surface 20 of the pan 12 for cooking, after assembling the interlocking segments of the screen 70. This reduces the influence of air movement over the heat source, which might otherwise burn coals too fast, carry heat away, disperse or blow out a gas flame, or the like.

Although one may cook by placing a pot 12 on or above the heat source, one may instead place food on an open grill 72 similarly located. If using a Dutch oven 76 or any other type of pot, one may place thereon a lid 78 fitted to the pot 76. Upon removing the lid 78 from the pot 76 for any reason, whether checking cooking progress, serving, and so forth, one may place the lid 78 on an extended handle 16. Similarly, one may place cooking utensils on another handle 16 opposite.

In general, one may provide a stand having foldable legs 14 and extendable handles 16 positioned under a fire pan 12 (the pan 12). The system 10 may be readied by folding the legs 14 out, setting them on the ground or other supporting surface (e.g., pavement, table, parking lot, patio, etc.), and extending the handles 16 (optional for handling when hot or to hold items during cooking). Before putting heat in the pan 12, one may place a thin layer of from about ¼ to about ½ inch of sand, diatomaceous earth, or the like in the pan 12 to absorb spills, and reduce heat transfer from the heat source to the pan 12.

After providing a heat source, such as by a gas flame, building or otherwise placing a fire of wood or charcoal coals in the pan, or the like, one may place a Dutch oven 76 on the heat source (fire), with the legs of the Dutch oven 76 resting on the upper surface 20 of the pan 12. The unit may be moved, even with fire present, by extending the handles 16 radially outward (away) with respect to the pan 12. Since the handles 16 are permanently secured to the pan 12 to slide in and out (translate), one may adjust the position of the handles 16 at will at any time.

In addition to providing a source of heat on the pan 12, under the Dutch oven 76, coals may be distributed on the lid 78 of the Dutch oven 76 as well. Any time the lid 78 is removed, one may place the lid 78 of the Dutch oven 76 on one of the handles 16 extended. One may place utensils on the other handle 16.

After removing the Dutch oven 76 from the pan 12, it may be advisable to dispose of burning heating materials, such as by smothering coals in a closed container or pouring them into a safe fire pit. Without fire, the pan 12 will cool. One may then begin stowage by removing the optional wind screen 70, if present, dismantling the segments, and nesting them. They will fit near the edge of the pan 12 between the handles 16. One may compact the system 10 by sliding the handles 16 to the retracted position, unlocking the legs 14, and folding them into the stowed position. If an optional grill 72 is present, it may be placed over the pan 12 or under the folded legs 14.

Telescoping legs 14 may be used instead, but usually at the expense of the curvature needed to fit along the spherical shape of the pan 12, and with the risk of accidental collapse, as well as a more complex manufacturing and use process. In certain embodiments, the legs 14 may be formed to extend from flanges 40 extending outward from the pan 12. Thus the brackets 26 may be formed to support the legs pivoting downward to a deployed position supporting the pan 12 above the ground. By positioning the brackets 26 with their flanges extending radially outward from the pan 12, the legs 14 may pivot upward and inward to a stowed position inside (on the top of) the pan.

Figure 20:
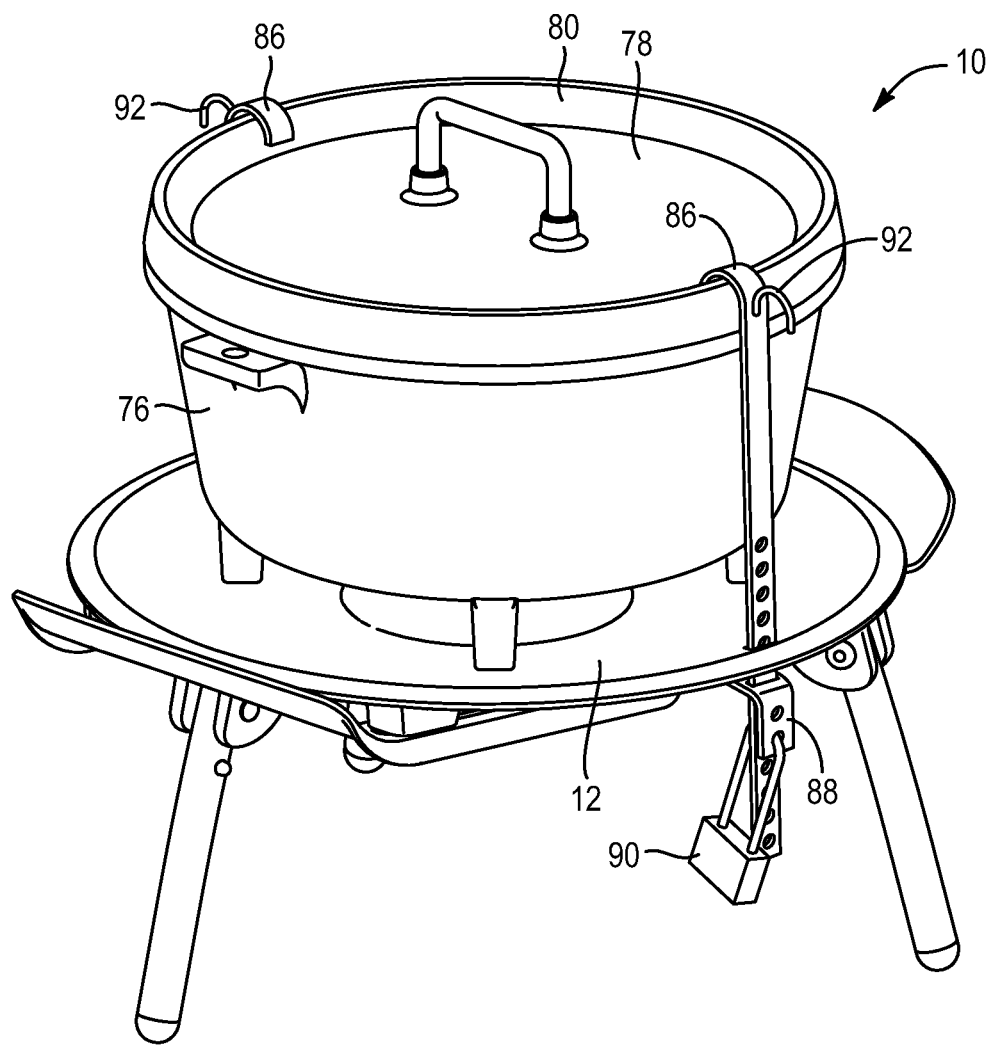
FIG. 20 is a perspective view of the apparatus of FIG. 1, having a locking system in place to secure a Dutch oven in place on the pan thereof against tampering.

Referring to FIG. 20, a locking system anchors a Dutch oven to the pan 12 to resist tampering when a user may be absent. An anchor 86 may be formed to latch down or hook over the top of the lid 78 of a Dutch oven 76. The anchor may extend downward from a hook portion near the top thereof, the hook being suitably shaped to capture the lip 80 of the lid 78. A lifter 92 may extend outward from the top portion of the anchor 86 for easy lifting of the anchor 86 by a user.

A stand off 88 or bracket 88 may be formed with an aperture to receive the anchor 86, and other apertures to receive a moveable element (bolt) of a lock 90. The lock 90 holds the anchor down, the anchor passing through a slot in the pan 12 or other ear formed on the pan for the purpose. The stand off 88 or bracket 88 permits the lock to be passed through the anchor without a user touching the pan 12, which may be very hot during use.

Apertures distributed along the lower portion of the length of the anchor 86 may receive the bolt of the lock 90. The bolt passes through the bracket 88 and the anchor 86, thus securing the lid 78 and Dutch oven 76 downward.

The present invention may be embodied in other specific forms without departing from its principles of operation or essential characteristics. The described embodiments are to be considered in all respects only as illustrative, and not restrictive. The scope of the invention is, therefore, indicated by the appended claims, rather than by the foregoing description. All changes which come within the meaning and range of equivalency of the claims are to be embraced within their scope.

What is claimed and desired to be secured by United States Letters Patent is:

1. A method comprising:
providing a pan defining a vertical direction upward and away therefrom and a radial direction orthogonal to the vertical direction, the pan comprising a top surface extending solidly and unperforated in the radial direction;
providing legs pivotably connected to the pan and moveable between a deployed position and a storage position;
providing handles secured to the pan along extensions formed integrally with the handles to selectively slide the handles radially toward and away from one another, the extensions mutually overlapping radially in a retracted position, yet offset to not interfere with each other;
the providing the handles, further comprising providing attachments securing the handles to the pan to be moveable in translation with respect thereto;
deploying the legs from a storage position to a deployed position;
extending the handles from the retracted position to an extended position, wherein a grip portion of each handle is spaced away from the pan a greater distance than in the retracted position;
supporting a combustible solid as a heat source resting directly on the top surface of the pan;
positioning a cooking surface of a Dutch oven above the heat source by supporting the Dutch oven directly on the top surface;
cooking a foodstuff on the cooking surface;
removing the heat source;
waiting while the pan cools to a temperature sufficiently low to permit safe handling;
moving the handles to the retracted position;
folding the legs from the deployed position to the storage position.

2. The method of claim 1 further comprising:
the providing the handles, further comprising:
providing a base fixed to the pan;
providing rails fixed to the base and extending away therefrom;
providing slots in the handles, each slot of the slots fitted to a rail of the rails; and
providing keepers securing the respective rails within the slots corresponding thereto.

3. The method of claim 1 further wherein the providing a pan, further comprising casting the pan from a metal.

4. The method of claim 3 wherein providing a pan further comprising casting brackets into a lower side of the pan.

5. The method of claim 4 wherein the brackets are formed to match the legs, each bracket hinging a leg of the legs for pivoting that leg with respect to the pan.

6. The method of claim 4 further comprising:
the providing a pan, further comprising casting stops proximate the brackets, the stops each forming a registration position controlling the deployed position of the legs corresponding thereto.

7. The method of claim 1 further comprising:
providing the pan, further comprising casting a dish from a metal, wherein the dish comprises a comparatively smoother top surface, and a lower surface, the lower surface having cast thereinto brackets configured to secure to the legs; and
casting rails fitted to secure the handles in sliding arrangement.

8. The method of claim 1 further comprising:
providing a wind screen;
providing a grill fitted to be supported by and above the windscreen; and
the providing a windscreen, further comprising providing multiple pieces, fitted to interlock together to form the windscreen from at least two individual, separable segments.

9. The method of claim 1, further comprising:
placing a pot over the heat source;
placing a combustible solid on a lid fitted to the pot on the pot;
removing the lid from the pot;
placing the lid on a handle of the handles; and
placing cooking utensils on another handle opposite the first handle.

10. A method comprising:
providing a stand;
the providing a stand, further comprising
providing a pan formed to extend radially, solid and unperforated, along a top surface thereof formed to support a combustible solid as a heat source,
providing handles permanently secured to the pan to remain permanently therewith, the handles being translatable between a first stowed position wherein grips of the handles are positioned proximate the pan, and a second deployed position wherein the grips of the handles are positioned away from the pan, and
providing legs, each pivotably secured to the pan to move between a first, stowed, position proximate the pan and a second, deployed, position distal from the pan;
extending the legs to the deployed position thereof;
extending the handles to the extended position thereof;
providing a combustible solid, as a source of heat, directly on the pan;
placing a Dutch oven directly on the pan to position the Dutch Oven over the source of heat;
placing a lid of the Dutch oven on one of the handles in the deployed position; and
placing utensils on the other handle opposite the lid.

11. The method of claim 10 further comprising locking the legs in the deployed position.

12. The method of claim 10 further comprising sliding the handles in translation from the stowed position to the extended position.

13. The method of claim 10, wherein providing a stand further includes providing the handles to have a grip portion and to extension portions each, the grip portion comprising a substantially stiff portion extending between the two extension portions, and each extension portion comprising an elongate, monolithic piece formed unitarily with the grip, and being provided with an elongate aperture receiving a stud extending from the pan to a keeper, the extension being captured permanently between the pan and the keeper to secure the handle thereto.

14. The method of claim 10, further comprising:
removing the Dutch oven from the pan;
removing the heat source from the pan;
cooling the pan;
sliding the handles to the retracted position; and
folding the legs to the stowed position by releasing the locks.

15. The method of claim 10, further comprising:
fitting a windscreen to the pan; and
providing a grill supported by the windscreen, spaced from the upper surface of the pan by the windscreen.

16. The method of claim 15, wherein the source of heat is selected from wood, charcoal, and a combustible gas.

17. The method of claim 16, further comprising:
dismantling the windscreen into at least two pieces; and
packing the stand, windscreen, and grill proximate one another;
the packing, wherein the stand, windscreen and grill fit into a spatial envelope circumscribed by a circle having a diameter not larger than the distance between the outer extremities of the grips of the handles in the stowed position.

18. A method comprising:
providing a pan defining a vertical direction upward and away therefrom and a radial direction orthogonal to the vertical direction, the pan comprising a top surface extending solidly and unperforated in substantially the radial direction;
providing legs pivotable against the pan in a stowed configuration and away from the pan in a deployed configuration wherein the legs support the pan on a supporting surface a distance effective to protect the supporting surface from heat generated on the top surface;
providing handles comprising grip portions integrally formed with extensions, the respective extensions being slidably secured to the pan to selectively translate the grip portions radially toward one another, to a retracted position, and away from one another, to an extended position;
the providing handles, wherein the extensions are mutually overlapping radially in the retracted position, yet offset to not interfere with each other;
deploying the legs from the stowed position to the deployed position;
supporting a combustible solid as a heat source resting directly on the top surface of the pan; and
positioning a cooking surface of a Dutch oven above the heat source by supporting the Dutch oven directly on the top surface.

19. The method of claim 18, further comprising:
spacing the grip portions away from the pan by extending the handles from the retracted position to the extended position; and
storing at least one of a lid of the Dutch oven and a cooking utensil on the handles.

20. The method of claim 19, further comprising:
positioning a quantity of the combustible solid on top of the lid;
cooking a foodstuff with heat from the cooking surface and the lid;
moving the handles to the retracted position; and
folding the legs to the stowed position inside a radial envelope defined by the pan.

* * * * *